(12) United States Patent
Yokomitsu et al.

(10) Patent No.: US 7,633,948 B2
(45) Date of Patent: Dec. 15, 2009

(54) RELAY DEVICE AND SERVER, AND PORT FORWARD SETTING METHOD

(75) Inventors: Yasushi Yokomitsu, Chikushino (JP); Kazuo Hirahara, Fukuoka (JP); Hiroshi Konishi, Kasuga (JP)

(73) Assignee: Panasonic Corporation, Osaka (JP)

(*) Notice: Subject to any disclaimer, the term of this patent is extended or adjusted under 35 U.S.C. 154(b) by 691 days.

(21) Appl. No.: 10/883,962

(22) Filed: Jul. 6, 2004

(65) Prior Publication Data

US 2005/0041596 A1 Feb. 24, 2005

(30) Foreign Application Priority Data

Jul. 7, 2003 (JP) ............... P.2003-192671
Jul. 7, 2003 (JP) ............... P.2003-192672
Jul. 7, 2003 (JP) ............... P.2003-192673

(51) Int. Cl.
*H04L 12/28* (2006.01)
*G06F 13/00* (2006.01)

(52) U.S. Cl. ............ 370/395.54; 370/401; 709/225; 709/227; 709/245

(58) Field of Classification Search ............ 370/235, 370/331, 338, 395.1, 395.54, 401; 709/245, 709/249, 200, 225–227; 711/210
See application file for complete search history.

(56) References Cited

U.S. PATENT DOCUMENTS

| | | | |
|---|---|---|---|
| 6,038,233 A | 3/2000 | Hamamoto | |
| 6,058,431 A * | 5/2000 | Srisuresh et al. | 709/245 |
| 6,094,713 A * | 7/2000 | Khadder et al. | 711/210 |
| 6,185,598 B1 * | 2/2001 | Farber et al. | 709/200 |
| 6,523,696 B1 | 2/2003 | Saito | |
| 6,973,200 B1 * | 12/2005 | Tanaka et al. | 382/103 |
| 7,111,079 B2 * | 9/2006 | Cheng | 709/249 |
| 2002/0010799 A1 | 1/2002 | Kubota et al. | |

(Continued)

FOREIGN PATENT DOCUMENTS

JP 11-187061 7/1999

(Continued)

OTHER PUBLICATIONS

Partial International Search Report dated Apr. 6, 2005.

(Continued)

*Primary Examiner*—William Trost, IV
*Assistant Examiner*—Emmanuel Maglo
(74) *Attorney, Agent, or Firm*—Dickinson Wright PLLC

(57) ABSTRACT

The present invention has an object to provide a relay device capable of performing dynamic port forward setting to open a port even if performing a connection in two stages and being connected to a network and a port forward setting method, and relates to a router for relaying a data packet which has such a structure as to comprise a control portion for giving a port forward setting request to an upper router 2 to perform the port forward setting of the upper router 2 and to relate port forward setting for a CP4 to port forward setting of a router upon receipt of the port forward setting request from the CP4 when a WAN side I/F portion is connected to an internet 1 through the upper router 2 and a LAN side I/F portion is connected to the CP4.

38 Claims, 25 Drawing Sheets

U.S. PATENT DOCUMENTS

| | | | |
|---|---|---|---|
| 2003/0031155 A1* | 2/2003 | Idehara | 370/338 |
| 2004/0073704 A1* | 4/2004 | Paunikar et al. | 709/245 |
| 2004/0218614 A1 | 11/2004 | Yokomitsu et al. | |

FOREIGN PATENT DOCUMENTS

| | | |
|---|---|---|
| JP | 2002-217941 | 8/2002 |
| JP | 2002290437 | 10/2002 |
| JP | 2002-353968 | 12/2002 |
| JP | 2002-358254 | 12/2002 |
| JP | 2003-6074 | 1/2003 |
| JP | 2003-091472 | 3/2003 |
| JP | 2003198586 | 7/2003 |
| WO | 03058924 | 7/2003 |

OTHER PUBLICATIONS

Srisuresh et al,. "RFC 2663—IP Network Address Translator (NAT) Terminology and Considerations," Network Working Group, XP002204216, pp. 1-30, Aug. 1999.

Schmitz et al.,"WANIPConnection: 1 Service Template Version 1.01 (Chapters 1 and 2)," UPNP Forum, XP002298367, pp. 1-33, Nov. 12, 2001.

Japanese Office Action dated Jun. 16, 2008 with English translation thereof.

Japanese Office Action dated Jul. 14, 2008 with English translation thereof.

Japanese office action (Decision of Refusal) dated Jul. 7, 2009 with English translation.

PR-Universal Plug and Play, Forum Asia Summit in Tokyo Held, WindowsCE FAN, Oct. 31, 2002, 2 pages total, with English translation. <http://www.wince.ne.ip/snap/ceSnapView.asp?PID=1002>.

* cited by examiner

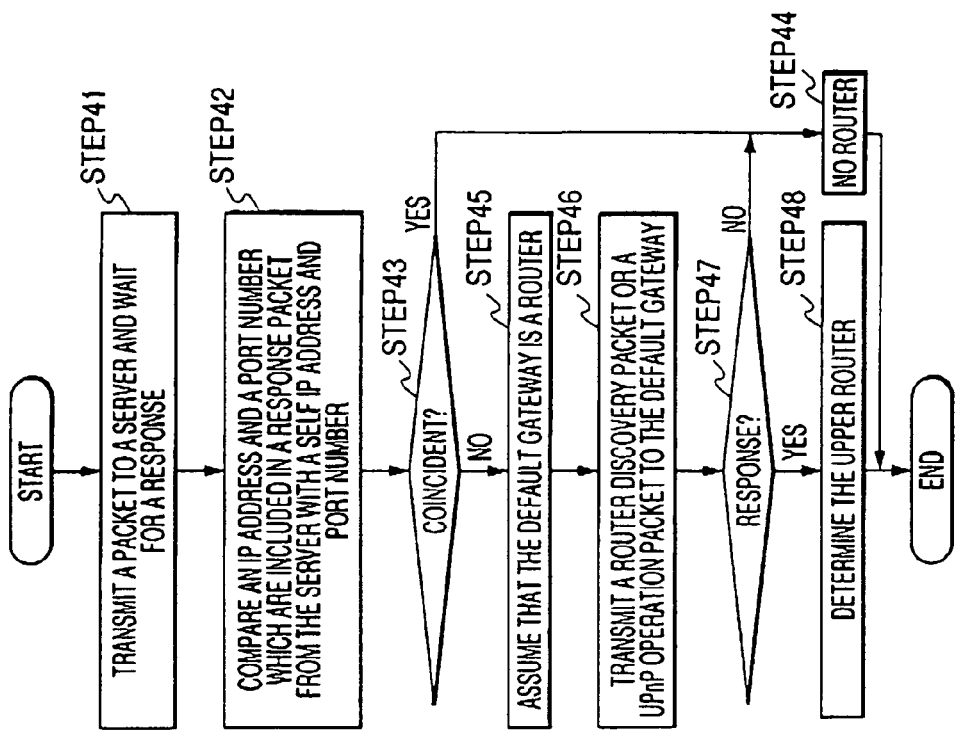
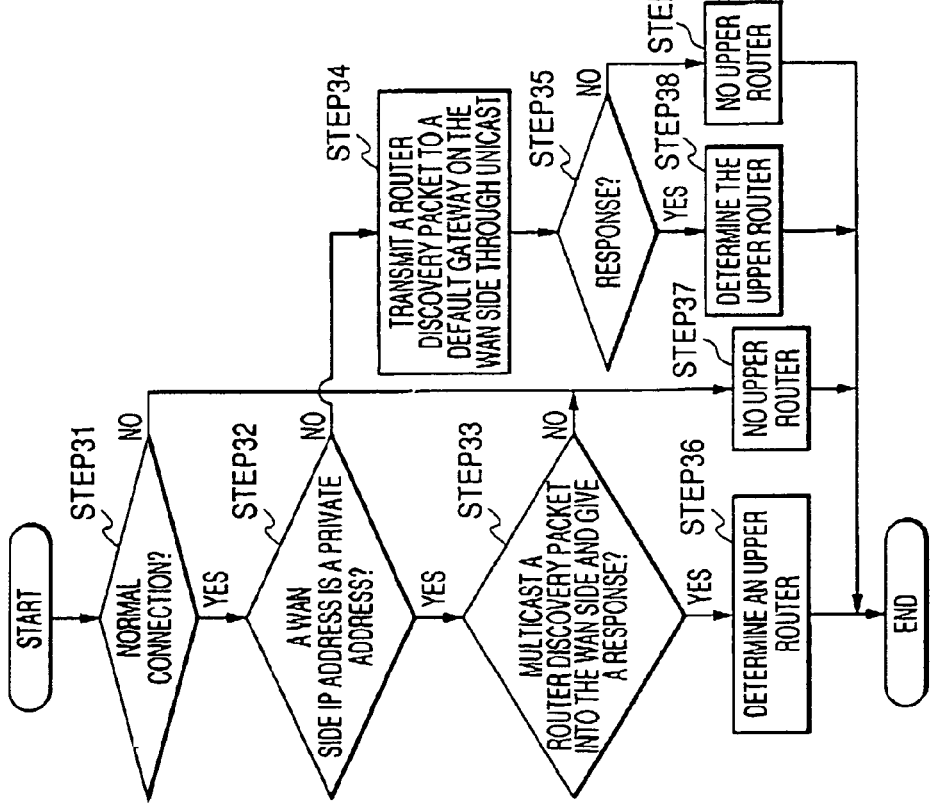
FIG. 5B
FIG. 5A

FIG. 13

DHCP ASSIGNMENT TABLE

| IP ADDRESS | MAC ADDRESS | NAME OF APPARATUS |
|---|---|---|
| 192.168.0.2 | 00--22--33-44 | RELAY DEVICE 9 |
| 192.168.0.3 | 00--33--22-21 | COMPUTER DEVICE 10 |
| 192.168.0.4 | 01--89--45-91 | COMPUTER DEVICE 11 |
| 192.168.0.5 | 22--73--63-58 | COMPUTER DEVICE 12 |
| ⋮ | ⋮ | ⋮ |

FIG. 15

```
RELAY DEVICE WEB TOP PAGE

CAUTION!
A CONNECTION TO AN INTERNET CANNOT BE PERFORMED
ACCURATELY BECAUSE A FIRST NETWORK AND A SECOND
(LAN SIDE) NETWORK OF THIS APPARATUS ARE IDENTICAL TO EACH
OTHER.
YOU CAN GET A SOLUTION BY CHANGING SETTING IN THE
FOLLOWING MANNER.

CURRENT LAN NETWORK    ⇒    RECOMMENDED LAN NETWORK
    192.168.0.0/24                  192.168.1.0/24

CHANGED?        [ YES ]      [ NO ]
```

FIG. 18

| IP ADDRESS | MAC ADDRESS | NAME OF TERMINAL |
|---|---|---|
| 192.168.0.2 | 00--22--33-44 | RELAY DEVICE 7 |
| 192.168.0.3 | 00--33--22-21 | IMAGE SERVER 9a |
| 192.168.0.4 | 01--89--45-91 | IMAGE SERVER 9b |
| 192.168.0.5 | 22--73--63-56 | IMAGE SERVER 9c |
| ⋮ | ⋮ | ⋮ |

FIG. 19

| EXTERNAL PORT NUMBER | TERMINAL IP ADDRESS | TERMINAL PORT NUMBER | NAME OF TERMINAL | TERMINAL MAC ADDRESS |
|---|---|---|---|---|
| 8000 | 192.168.0.1 | 80 | IMAGE SERVER 8a | -80-F0--**-10 |
| 8001 | 192.168.0.2 | 800 | IMAGE SERVER 8b | -80-F0--**-02 |
| 8002 | 192.168.0.3 | 80 | IMAGE SERVER 8c | -80-F0--**-11 |
| 8003 | 192.168.0.4 | 80 | COMPUTER DEVICE 9 | -55-3A--**-72 |
| ...... | ...... | ...... | ...... | ...... |

FIG. 20

| EXTERNAL PORT NUMBER | UPPER RELAY DEVICE PORT NUMBER |
|---|---|
| 80 | 80 |
| 8000 | 8000 |
| 8001 | 8003 |
| 8002 | 8004 |
| ...... | ...... |

RELAY DEVICE AND SERVER, AND PORT FORWARD SETTING METHOD

BACKGROUND OF THE INVENTION

1. Field of the Invention

The present invention relates to a relay device and a server which relays a data packet, and particularly to a relay device capable of performing dynamic port forward setting and a setting method thereof.

2. Description of the Related Art

In order to always perform a connection to a wide area network such as an internet, the spread of a CATV has become serious and the spread of a broad band router has also become remarkable. However, the absolute number of global IP addresses (hereinafter referred to as external IP addresses) is insufficient in an existing IP protocol IPv4. For this reason, a countermeasure is taken against the shortage of the external IP address by using an NAT (Network Address Translation) function and a port forwarding function (a static IP masquerade).

The NAT function serves to convert a local IP address (an internal IP address which will be hereinafter referred to as an IP address) into an external IP address on the WAN side of a router when access is given from a CP on an LAN side to an internet. Consequently, the CP on the LAN side can give access to the internet by using the external IP address of the router.

On the other hand, the port forwarding function serves to transfer a packet directed to the external IP address and external port number of the router to a corresponding internal IP address and port number by using a preset port mapping table. Consequently, access can be given from the internet to a specific CP on the LAN side. More specifically, a conversion table (a port mapping table) for a port number and an IP address is first preset to the router, and the external IP address and external port number of the router is designated when access is given from the internet. The router accepting the access converts the external IP address into the IP address in accordance with the preset port mapping table. By the conversion, access can be given to the CP in the LAN having the IP address.

By the port forwarding function and the NAT function, a conventional router relieves the exhaustion of the external IP address and connects a plurality of user CPs in a LAN to an internet. However, a user is to obtain the port number of the CP and to manually perform setting and changes.

However, the manual setting is troublesome, and furthermore, is insufficient in respect of the practical utilization of a port. For this reason, there was created a standard for dynamically performing port forward setting (port mapping) by a UPnP forum (see a UPnP standard, internet <URL: http://www.upnp.org/standardizeddcps/default.asp>). In the setting of the standard, an external port is designated from a terminal to be a follower to a router to give a request for port forward setting and the router performs a registration if possible and the terminal sends a request again if impossible, and this is repeated until a determination is performed.

Specific description will be given to dynamic port forward setting to be executed based on a UPnP standard to be performed when an apparatus (a Control Point which will be hereinafter referred to as a CP) such as a computer device to a router to which an external IP address "60. 50. 40. 3" is assigned.

First of all, when the CP is connected to the router, it transmits a DHCP discovery packet and a DHCP server assigns an unused IP address "192. 168. 0. 1" to the CP. Subsequently, the CP transmits a router discovery packet and the router responds thereto. Upon receipt of the response, the CP transmits a port forward setting request specifying an external port number so that the router assigns the external port number to a port mapping table and responds thereto. The IP address and the port number of a CP to be a request source and the external port number of the router are designated for the port forward setting request. For example, when a port forward setting request specifying the IP address "192. 168. 0. 1" of the CP, a port number "80" of the CP and a router external port number "8081" is given from the CP, a port mapping table relating the IP address "192. 168. 0. 1" and the port number "80" of the CP to the router external port number "8081" is generated and stored by the router.

When the port mapping table is thus generated automatically and access is then given with "http//:60. 50. 40. 3 : 8081" from the client terminal of an external IP address "232. 0. 0. 2" connected to an internet, the router performs port forwarding over the packet to "http//:192. 168. 0. 1 : 80" in accordance with the port mapping table generated dynamically.

As described above, the dynamic port forwarding setting function of the UPnP standard of the conventional router sends a request for the port forward setting from the CP to be the follower to the router, and the router performs a registration if possible, and the terminal sends a request again if impossible. This operation is repeated until a determination is performed.

However, the CP can set the port forward to only the router in a subnet. In the case in which another router is required for the connection to the internet, it does not know the presence of the CP. After all, it is impossible to ensure a router to which access is given from the WAN side.

FIG. 26 is an explanatory view in which a conventional router having a UPnP standard is provided between an internet and a CP in two stages.

In FIG. 26, an upper router 102 has a WAN side I/F portion (not shown) to be connected to a WAN (an internet 101) for a communication through TCP/IP and a LAN side I/F portion (not shown) connectable to a LAN, and can dynamically perform port forward setting in accordance with a UPnP standard. Similarly, a lower router 103 has the WAN side I/F portion (which is connected to the LAN side I/F portion of the upper router 102) to be connected to the WAN for the communication through the TCP/IP and the LAN side I/F portion connectable to the LAN, and can dynamically perform the port forward setting in accordance with the UPnP standard.

The LAN side I/F portion of the lower router 103 is connected to a CP 104 such as a computer device. Accordingly, the internet 101 is connected to the CP 104 through a router having two stages which is constituted by the upper router 102 and the lower router 103.

A computer terminal 105 mounting a browser function is connected to the internet 101.

In case of a conventional UPnP standard compatible router connected in two stages, there is the drawback in routing. More specifically, the CP 104 connected to the router 103 can retrieve only the router 103 present on the same network. Accordingly, the CP 104 can perform the port forward setting for only the router 103 and cannot perform the port forward setting for the upper router 102. For the same reason, the CP 104 can acquire the outer IP address of the router 103 and cannot know the outer IP address of the router 102. When the computer 105 provided on the internet is to be connected to a web server operated on the CP 104 connected to the LAN side of the router 103, accordingly, the connection cannot be performed because the port of the upper router 102 is not opened. In the case in which a P2P communication is to be performed, moreover, the CP 104 can transfer the IP address of the CP 104 or the IP address of the router 103 to a communication partner. These two addresses are private IP addresses. For this reason, it is impossible to establish a communication session from the communication partner.

As the same kind of problems, conventionally, some relay devices for relaying a communication packet between a first network and a second network, for example, a router are caused to have a DHCP function and dynamically assign an IP address to a terminal to be a follower (the second network side).

In such relay devices, a user is to set an address range to be assigned to the terminal to be the follower by a manual operation, and a heavy burden is imposed on a user having no expertise.

Therefore, it can be proposed that an address range to be dynamically assigned to the relay device is preset. However, there is a possibility that the first network and the set address range might be coincident or overlap with each other. In some cases in which the address ranges of the first network and the second network are coincident or overlap with each other, access cannot be given from the terminal to be the follower to the first network. For example, in the case in which the first network and the second network have the same address "192. 168. 2. 1" respectively, a transmission to the second network side is simply performed and a transfer to the first network is not performed even if access is to be given from the second network side to a first network side apparatus "192. 168. 2. 1".

By assigning a non-overlapping address range is assigned from an upper relay device on the first network side, moreover, it is possible to avoid such a problem (see JP-A-2002-290437, for example). In the case in which there is no upper relay device for assigning an address range for a DHCP to the relay device, the problem cannot be solved.

As described above, in the case in which the addresses overlap with each other at the first network side and the second network side, there is a problem in that the routing of a packet between the networks cannot function well.

Finally, it is necessary to perform transfer setting such as port forward (a static IP masquerade function) for a router device connected between a wide area network and a local network in order to give access from the wide area network to a server connected into the local network. In order to give access from the wide area network side to a server in the local network, accordingly, it is necessary to input a port number to be transferred to a server in addition to the IP address or host name of a router.

Therefore, the applicant has proposed a router capable of dynamically generating a web page linked to a server such as a camera server and giving access from a client terminal to the router, thereby acquiring information from the server as described in JP-A-2003-198586.

As described above, the router proposed by the applicant can dynamically generate the web page linked to the server such as the camera server and can give access from the client terminal to the router, thereby acquiring the information from the server. However, there is not considered a countermeasure to be taken against the case in which a relay device for rewriting an IP address or a port number to transfer a packet is present between a client and a server.

SUMMARY OF THE INVENTION

Therefore, it is an object of the invention to provide a relay device capable of detecting a connection state in two stages and performing a proper control corresponding to a state.

In order to attain the object, the invention provides a relay device having a first interface and a second interface and serving to relay a data packet between a first network and a second network, comprising an upper relay device presence confirming portion for deciding whether the first interface is connected to a second relay device or is directly connected to a wide area network.

Consequently, a connection state in two stages can be detected. Corresponding to the detection of the state, dynamic forward setting is performed to open a port and the port can be connected to a network.

Alternatively, the assignment of the address of a DHCP can be properly performed. Also in the case in which a relay device for rewriting an IP address or a port number to transfer a packet is present between a client and a server, it is possible to dynamically generate a web page linked to the server such as a camera server and to give access from a client terminal to a router, thereby acquiring information from the server.

BRIEF DESCRIPTION OF THE DRAWINGS

FIG. 5A is a first flow chart showing the confirmation of the presence of an upper relay device which is to be performed from the relay device according to the first embodiment of the invention, and FIG. 5B is a second flow chart showing the confirmation of the presence of the upper relay device which is to be performed from the relay device according to the first embodiment of the invention, FIG. 13 is a table showing the contents of a DHCP assignment table in the relay device according to the second embodiment of the invention, FIG. 15 is a diagram showing the contents of a web page in the relay device according to the third embodiment of the invention, FIG. 18 is a table showing the contents of a DHCP assignment table in the relay device according to the fourth embodiment of the invention, FIG. 19 is a table showing the contents of a port mapping table in the relay device according to the fourth embodiment of the invention, FIG. 20 is a table showing the contents of upper relay device port mapping information in the relay device according to the fourth embodiment of the invention.

DETAILED DESCRIPTION OF THE PREFERRED EMBODIMENTS

Embodiments of the invention will be described below with reference to the drawings.

First Embodiment

Figure 1:
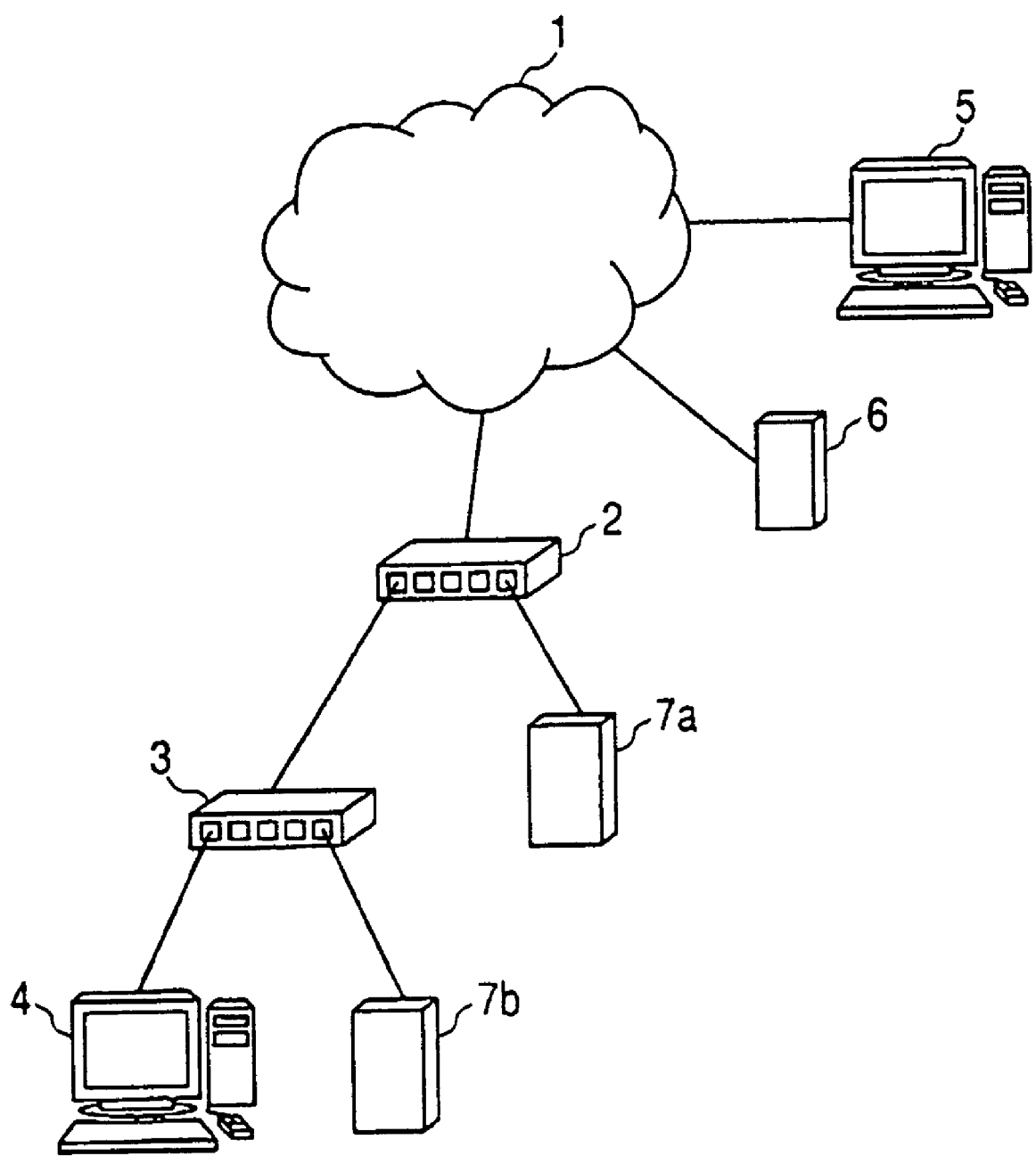
FIG. 1 is an explanatory view in which a relay device according to a first embodiment of the invention is provided in two stages between an internet and a CP.
Figure 2:
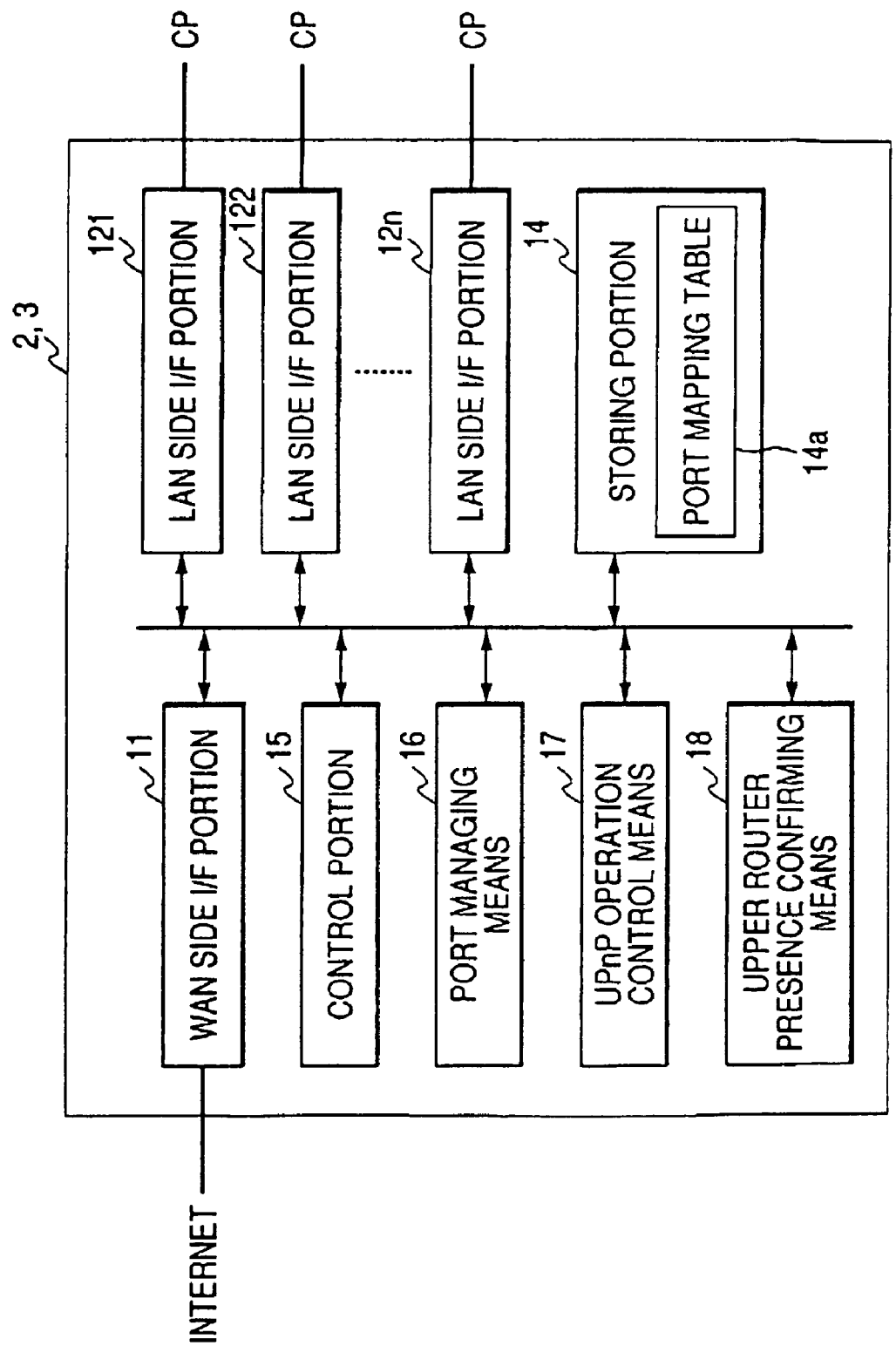
FIG. 2 is a diagram showing the structure of the relay device according to the first embodiment of the invention.
Figure 3:
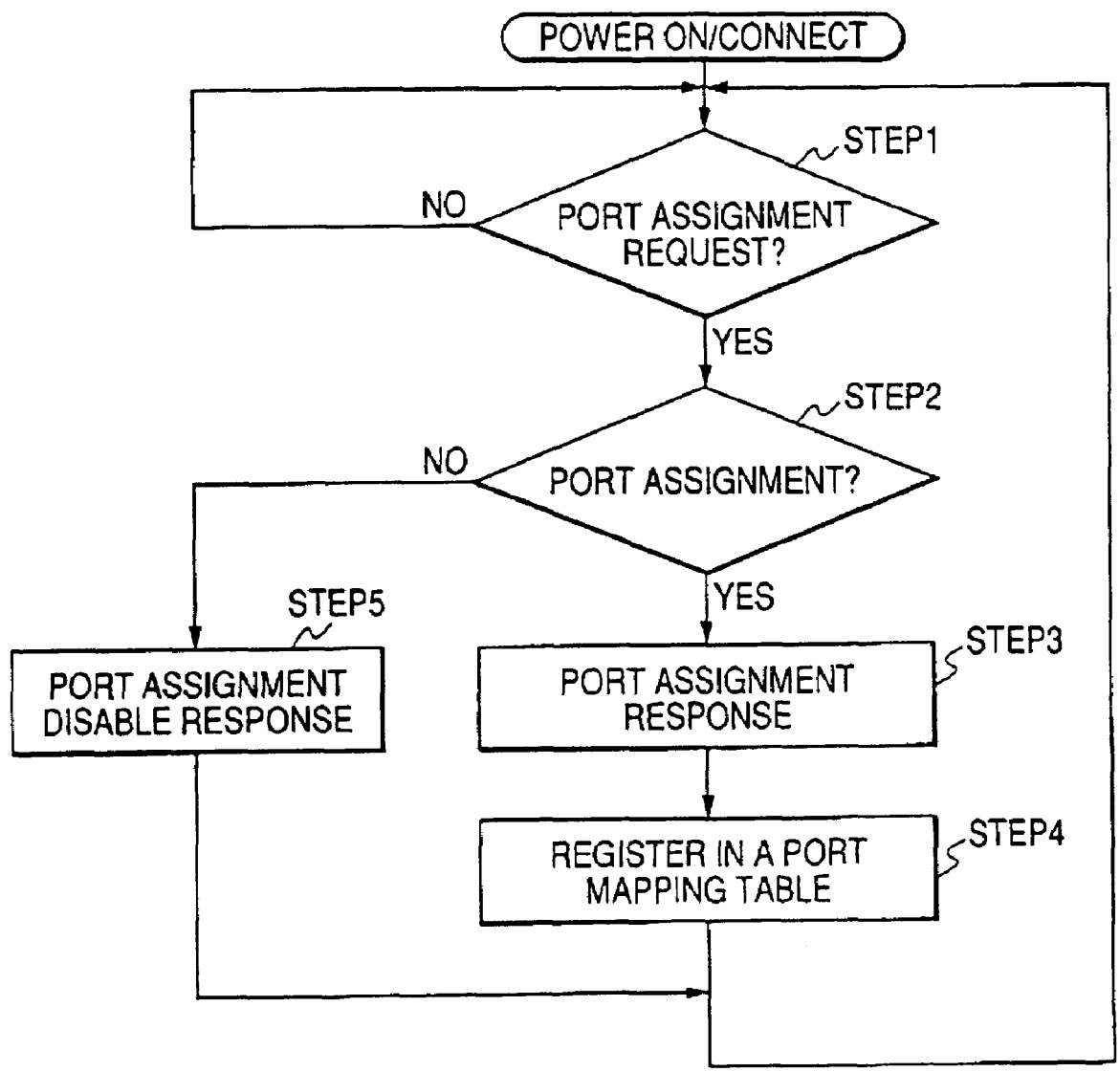
FIG. 3 is a flow chart showing a port assignment according to the first embodiment of the invention.
Figure 4:
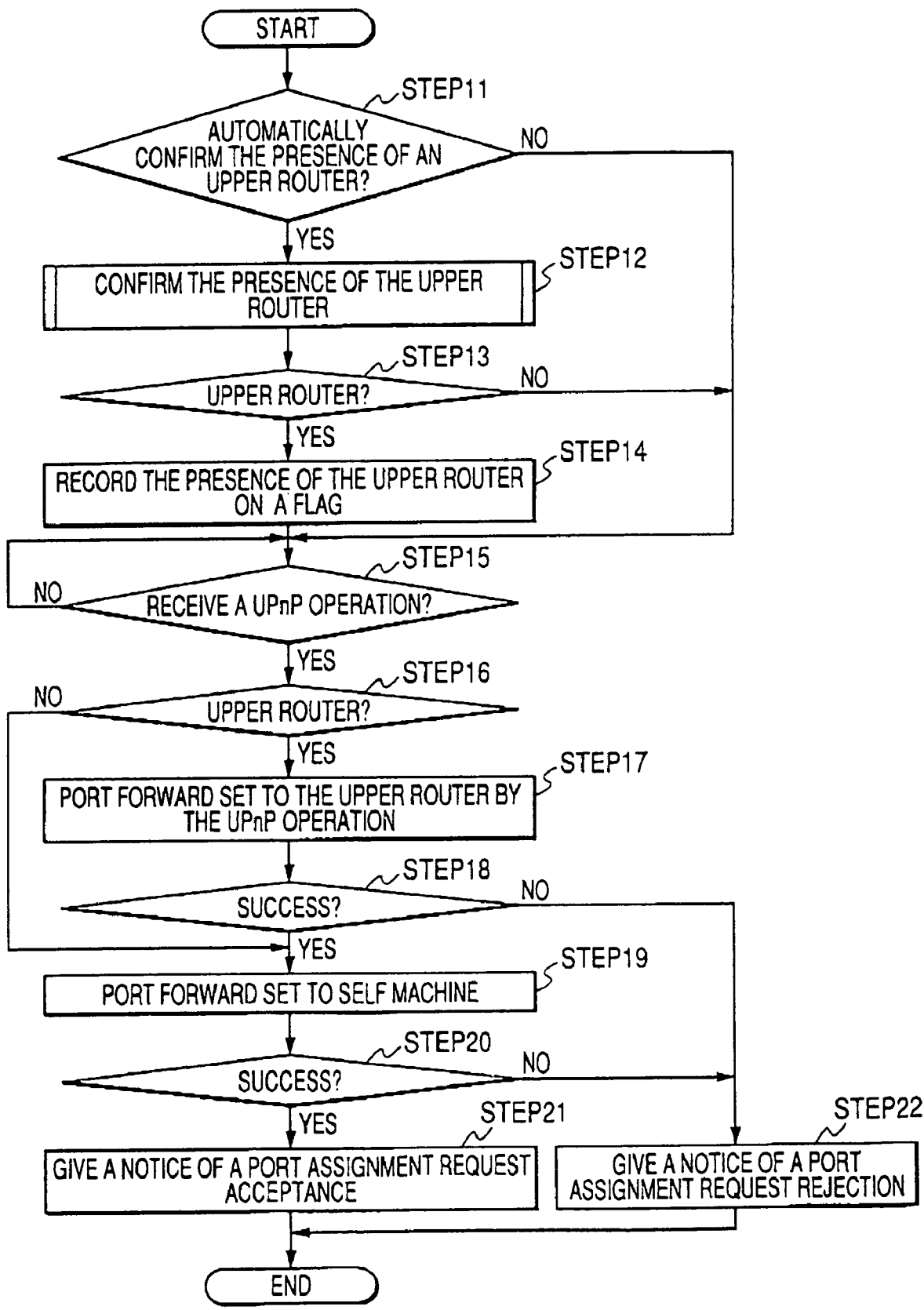
FIG. 4 is a flow chart showing a procedure for setting the relay device according to the first embodiment of the invention.
Figure 6A:
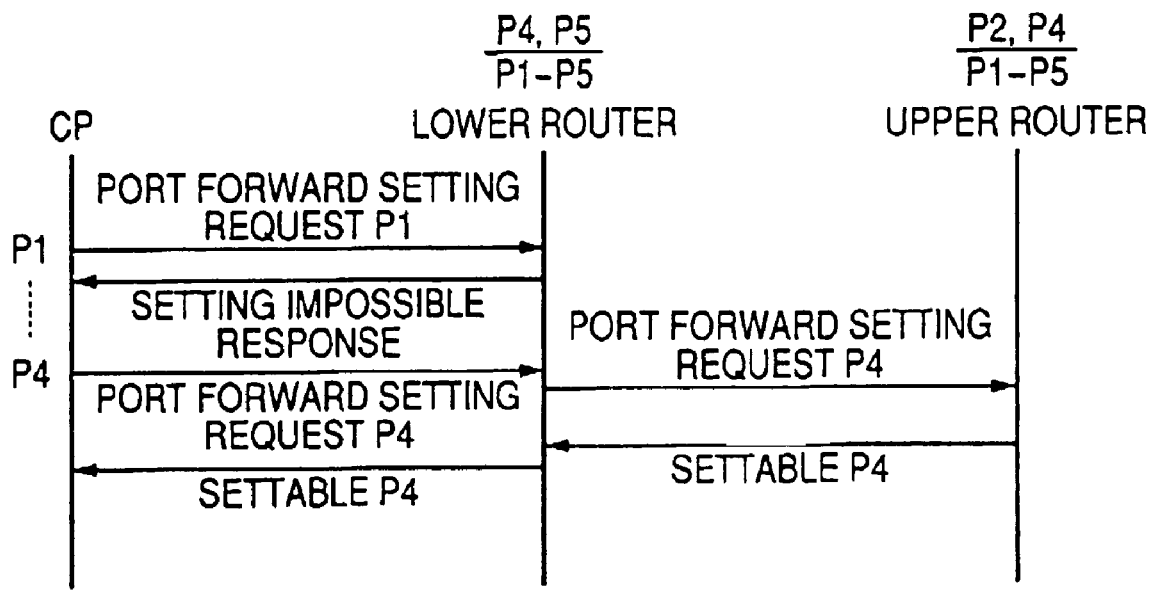
FIG. 6A is an explanatory diagram showing port forward setting in a first mode of the relay device according to the first embodiment of the invention.
Figure 6B:
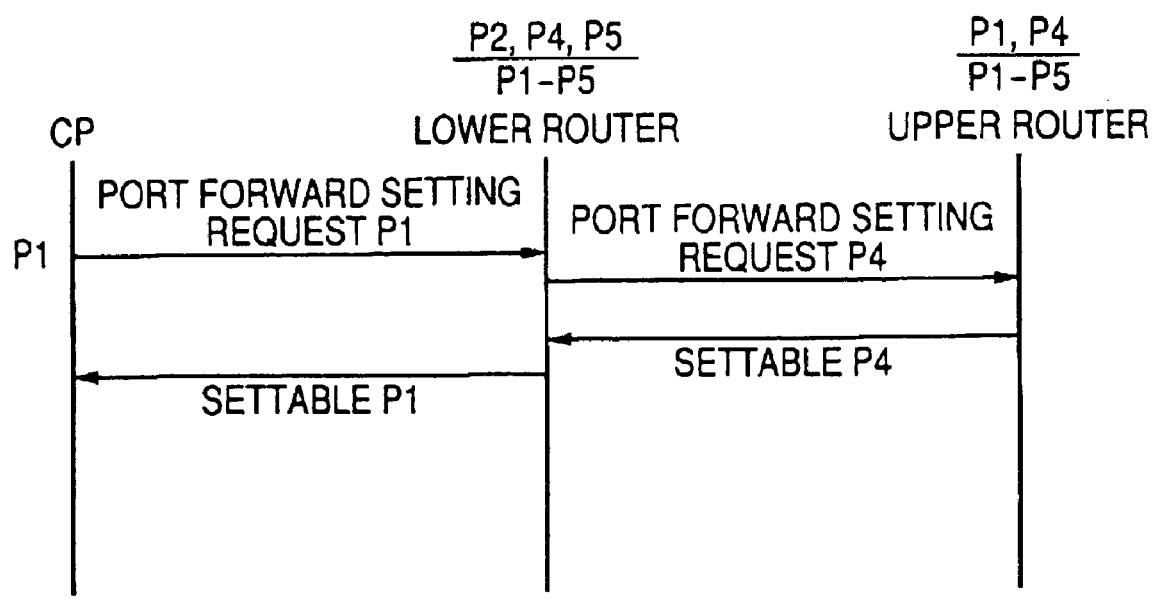
FIG. 6B is an explanatory diagram showing port forward setting in a second mode of the relay device according to the first embodiment of the invention.
Figure 7A:
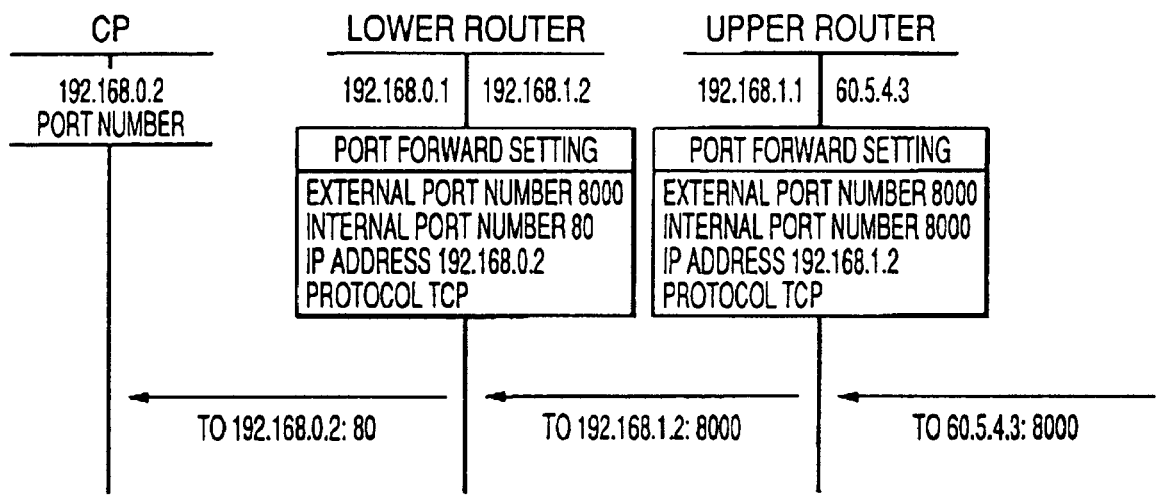
FIG. 7A is an explanatory diagram showing port forwarding in the first mode of the relay device according to the first embodiment of the invention.
Figure 7B:
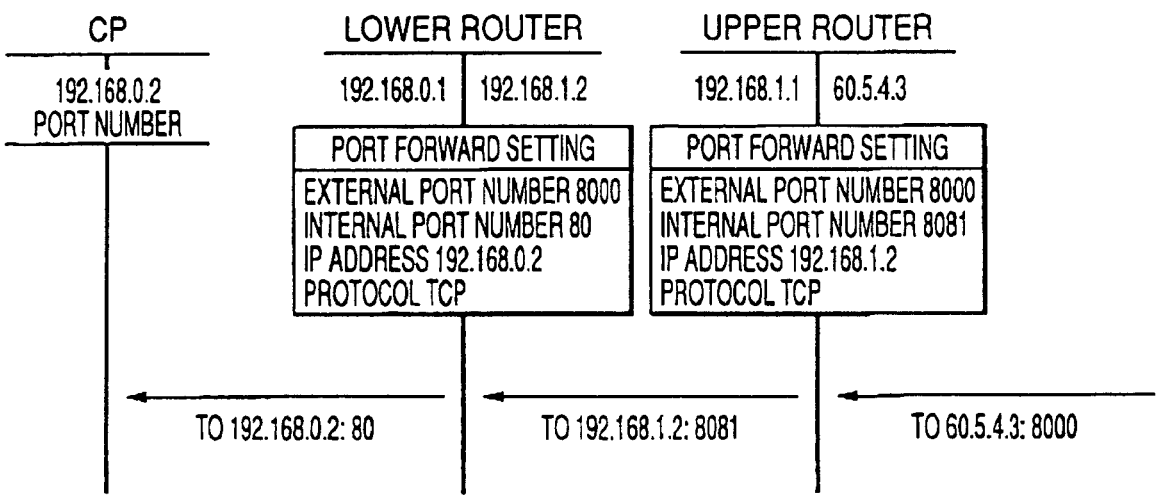
FIG. 7B is an explanatory diagram showing port forwarding in the second mode of the relay device according to the first embodiment of the invention.
Figure 8A:
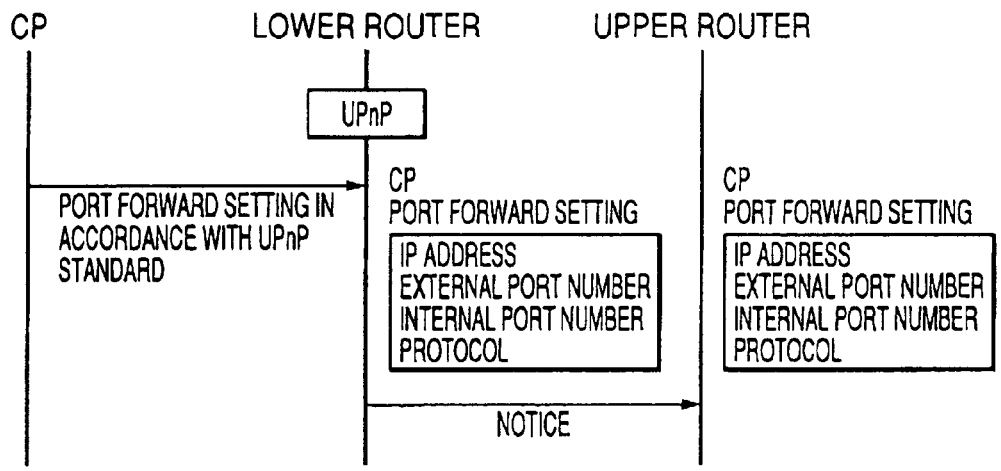
FIG. 8A is an explanatory diagram showing setting to be performed by a notice in accordance with the UPnP standard of the relay device according to the first embodiment of the invention.
Figure 8B:
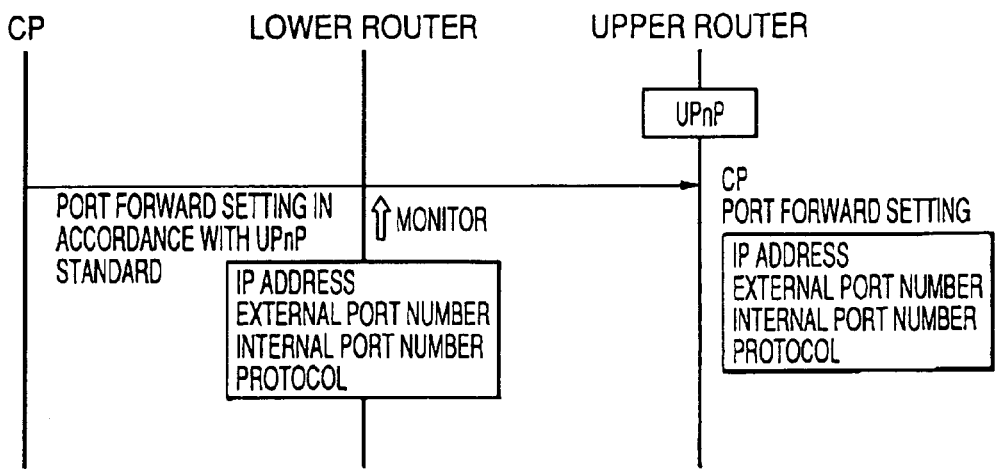
FIG. 8B is an explanatory diagram showing setting to be performed by monitoring in accordance with the UPnP standard of the relay device according to the first embodiment of the invention.

Description will be given to a relay device and a port forward setting method according to a first embodiment of the invention. FIG. 1 is an explanatory view showing a relay device (router) according to the first embodiment of the invention which is provided in two stages between an internet and a CP, FIG. 2 is a diagram showing the structure of the relay device according to the first embodiment of the invention, FIG. 3 is a flow chart showing a port assignment according to the first embodiment of the invention, FIG. 4 is a flow chart showing a procedure for setting the relay device according to the first embodiment of the invention, FIG. 5A is a first flow chart showing the confirmation of the presence of an upper relay device which is to be performed from the relay device according to the first embodiment of the invention, FIG. 5B is a second flow chart showing the confirmation of the presence of the upper relay device which is to be performed from the relay device according to the first embodiment of the invention, FIG. 6A is an explanatory diagram showing port forward setting in a first mode of the relay device according to the first embodiment of the invention, FIG. 6B is an explanatory diagram showing port forward setting in a second mode of the relay device according to the first embodiment of the invention, FIG. 7A is an explanatory diagram showing port forwarding in the first mode of the relay device according to the first embodiment of the invention, FIG. 7B is an explanatory diagram showing port forwarding in the second mode of the relay device according to the first embodiment of the invention, FIG. 8A is an explanatory diagram showing setting to be performed by a notice in accordance with the UPnP standard of the relay device according to the first embodiment of the invention, and FIG. 8B is an explanatory diagram showing setting to be performed by monitoring in accordance with the UPnP standard of the relay device according to the first embodiment of the invention.

In FIG. 1, an upper router 2 (a second relay device according to the first embodiment of the invention) has a WAN side I/F portion 11 (a first interface according to the first embodiment of the invention) to be connected to a WAN (an internet 1) for a communication through TCP/IP, and LAN side I/F portions $12_1, 12_2, \ldots, 12_n$ (a second interface according to the first embodiment of the invention) which are connectable to a LAN, and serves to dynamically perform port forward setting in accordance with a UPnP standard. Similarly, a lower router 3 (the relay device according to the first embodiment of the invention) has the WAN side I/F portion 11 connected on the WAN side (the WAN side I/F portion of the upper router 2 or the internet 1) for a communication through the TCP/IP, and the LAN side I/F portions $12_1, 12_2, \ldots, 12_n$ which are connectable to the LAN, and serves to dynamically perform the port forward setting in accordance with the UPnP standard.

In the upper router 2, the WAN side I/F portion 11 is connected to the internet 1 and the LAN side I/F portions $12_1, 12_2, \ldots, 12_n$ are connected to the WAN side I/F portion 11 of the lower router 3. Moreover, the LAN side I/F portions $12_1, 12_2, \ldots, 12_n$ of the lower router 3 are connected to a CP 4 such as a computer device. In the case in which the CP 4 is to be connected to the end of a network, it can also be referred to as a terminal device. Accordingly, the internet 1 is connected to the CP 4 to be the terminal device through a two-stage router constituted by the upper router 2 and the lower router 3.

A computer terminal 5 mounting a browser function and a DNS server 6 sending a response of an external IP address by an access with a host name are connected to the internet 1, and DHCP servers 7a and 7b for assigning an IP address from predetermined internal IP addresses (hereinafter referred to as IP addresses) in the LAN are also connected to the upper router 2 and the lower router 3, respectively. The DHCP servers 7a and 7b may be mounted in the routers 2 and 3.

In the first embodiment, when the CP 4 is connected to the lower router 3, the CP 4 corresponding to the UPnP standard sends a request for port forward setting to the lower router 3. If an assignment can be performed, the lower router 3 relates an external port number designated by the port forward setting request to the IP address and the port number of the CP 4 and registers them in a port mapping table. For example, the lower router 3 assigns a requested external port number such as "8081". Moreover, the lower router 3 assigns the IP address and the port number of the CP4, for example, "192. 168. 0. 1" and "80". In the case in which an external port to dynamically perform port forward setting to the lower router 3 in accordance with the UPnP standard cannot be assigned during use, the external router returns a notice of impossible setting. The CP 4 receiving the response sends a request for assigning another port number again and repeats this operation.

If the lower router 3 is directly connected to the internet 1 and has an external IP address, a communication packet reaches the CP 4 by the port forward function of the lower router 3 when access is given from the internet 1 side with the external IP address and the port number of "8081". However, in the case in which the lower router 3 does not have the external IP address connected directly to the internet 1, that is, the upper router 2 is provided between the lower router 3 and the internet 1, the communication with the CP 4 cannot be performed.

Brief description will be given to a schematic procedure for the port forward setting in case of the connection of the routers in two stages which is performed in the first embodiment.

First of all, the upper router 2 acquires an external IP address "60. 5. 4. 3" by connecting means such as the DHCP server (not shown) or a PPPoE on the internet 1, and "192. 168. 1. 1" is assigned to the LAN side IP address of the upper router 2 and "192. 168. 1. 2" is assigned to the WAN side IP address of the lower router 3 by the DHCP server 7a, and "192. 168. 0. 1" is assigned to the LAN side IP address of the lower router 3 by the DHCP server 7b.

The lower router 3 gives a port forward setting request to the upper router 2. For example, there will be supposed the case in which the CP 4 sends a request for port forward setting specifying an external port of "TCP No. 8000" to the lower router 3. In this case, an external port number of "8000", an IP address, an internal port number and a protocol are to be assigned to the CP 4 by the upper router 2 in such a manner that a packet is forwarded to the CP 4. In the first embodiment, therefore, the lower router 3 sends a request for assigning the external port number of "8000", the WAN side IP address "192. 168. 1. 2" of the lower router 3, the internal port number "8000", and the protocol "TCP" according to the port forward setting requested from the CP 4 to the upper router 2. The upper router 2 receiving the request decides whether or not the external port number "8000" can be assigned. If the assignment can be performed, a port mapping table for performing port forwarding to the lower router 3 is set with the external port number "8000".

When a user gives access from the computer terminal 5 with "http://60. 5. 4. 3 : 8000", the upper router 2 transmits a packet to a port having the external port number "8000" of the lower router 3 and the lower router 3 transfers the packet to the IP address of the CP 4. Consequently, the computer terminal 5 can be connected to the CP 4. Also when the external port number "8000" is assigned to another terminal in the lower router 3, the access can be given from the computer terminal 5 to the CP 4 by the assignment of an external port "8080" through the lower router 3 if the upper router 2 can assign the external port number "8000". At this time, the computer terminal 5 gives access with "http://60. 5. 4. 3 : 8000" and the upper router 2 receiving the http packet transfers the packet to the port 8080 of the lower router 2 based on the port forward setting. Subsequently, the lower router 2 transfers the packet to the CP 4 so that a communication from the computer terminal 5 to the CP 4 is formed.

First of all, the internal structures of the upper router 2 and the lower router 3 according to the first embodiment will be described with reference to FIG. 2.

In FIG. 2, the upper router 2 and the lower router 3 are provided with the WAN side I/F portion 11 between the CP 4 and the internet 1 and the LAN side I/F portions 12₁, 12₂, ..., 12ₙ to be connected to the CP 4 respectively. In the case in which there is provided a plurality of external IP addresses, a plurality of WAN side I/F portions 11 is provided.

A storing portion 14 stores control programs and various data and is provided with a port mapping table 14a for assigning port mapping information. The port mapping table 14a relates an external IP address and an external port number to an IP address and an internal port number together with a protocol, and an IP address, a port number and protocol information of the CP 4 to be the follower of the lower router 3 which are given from the lower router 3 and are subjected to the port forward setting can be related to an external IP address and an external port number and can be thus stored, for example. When one WAN side I/F portion is provided, the external IP address does not need to be related.

A control portion 15 is constituted as function implementing means for reading a control program into a central processing unit (CPU) and fulfilling each function. The control portion 15 serves to control a whole system, and furthermore, to perform an address conversion in accordance with the port mapping table 14a and to perform port forwarding over the received packet. Port managing means 16 serves to register each external port number of the lower router 3 and to delete an unnecessary port number. Moreover, UPnP operation control means 17 gives a notice of the WAN side IP address and external port number of the lower router 3, and the external port number and protocol of the upper router 2 to be set between the routers connected in the two stages such as the upper router 2 and the lower router 3. A UPnP operation serves to perform dynamic port forwarding in accordance with the UPnP standard.

When the port forward setting is to be performed between the routers connected in the two stages, moreover, it is necessary to confirm the presence of the upper router 2 and to then execute the port forward setting. For this reason, means 18 for confirming the presence of the upper router 2 is provided in the first embodiment. The upper router presence confirming means 18 performs an upper router 2 discovery sequence, thereby deciding the presence of the upper router 2 based on the result. The discovery sequence also includes a necessary information acquirement sequence for performing the UPnP operation for the upper router 2. The UPnP operation control means 17 and the upper router presence confirming means 18 are constituted as function implementing means by a CPU. Therefore, it is also suitable that the control portion 15 should wholly employ a structure for executing these functions.

When the lower router 3 is a UPnP router, the UPnP operation control means 17 gives the upper router 2 a notice of information such as the WAN side IP address and external port number of the lower router 3, and the external port number and protocol of the upper router 2 to be set, and the control portion 15 of the upper router 2 checks whether or not information having the same external port number and a different IP address of a transfer destination is present in the port mapping table 14a.

If the same external port is not present, the assignment can be performed. In the case in which the external port number is identical and the IP address is identical, a request is regarded to be sent from the same CP 4 (client) to permit an overwrite. In the case in which the external port number is identical and the IP address of the transfer destination is different, moreover, the control portion 15 of the upper router 2 rejects the assignment and gives a notice to the lower router 3. The lower router 3 gives, as its own reply to the CP 4 (client), a notice of the contents sent from the upper router 2. In the case in which the content of the notice is "rejected because a designated external port is being used by another CP", the CP 4 repeats the above procedure by setting a new external port number to be an assignment request port (a first assignment mode).

With a port number which is assigned for a specific use by the lower router 3 and cannot respond to an external port assignment request sent from the CP 4, similarly, the UPnP operation control means 17 can transfer the assignment request to the upper router 2 and can assign, to the upper router 2 itself, another external port number which can be set (a second assignment mode).

For example, in the case in which an external port number "60001" of the lower router 3 has already been set as a port forwarding object to a CP other than the CP 4, the external port number "60001" is designated to the upper router 2 and a request for the port forward setting in relation to the WAN side IP address and external port number (for example, "50001") of the lower router 3 is given and the external port number "50001" of the lower router 3 is related to the IP address and the port number of the CP 4 and is automatically allocated to the port mapping table 14a when a request for assigning the external port number "60001" is given from the CP 4.

Consequently, a packet reaching the external port "60001" of the upper router 2 is transferred to the external port "50001" of the lower router 3 in accordance with transfer setting. The lower router 3 receiving the packet further transfers a packet to the CP 4 in accordance with the transfer setting. This will be described below in detail.

Description will be given to an operation for dynamically performing port forward setting based on the UPnP standard in the upper router 2 according to the first embodiment.

In FIG. 3, in the first assignment mode, if the lower router 3 receives a request for the port forward setting from the CP 4 when the CP 4 is connected, a power supply is turned ON or an application is started, the port managing means 16 assigns a port and registers the assignment in the port mapping table 14a. Moreover, the upper router 2 also assigns a port number in accordance with the request for the port forward setting which is sent from the lower router 3 to be the follower.

First of all, the control portion 15 of the lower router 3 stands by till the receipt of the port assignment request packet and checks whether or not the port forward setting request (the port assignment request) is sent (step 1). The control portion 15 stands by again when the request for the port forward setting is not sent, and checks whether or not the port assignment can be performed when the port forward setting request is sent (step 2). Whether the port assignment can be performed is decided depending on whether the external port number designated by the port forward setting request sent from the CP 4 has already been registered in the port mapping table 14a or whether a port number is being used.

If it is decided that the port assignment can be performed corresponding to the case in which the external port number is not registered in the port mapping table 14a and is not used for others, the control portion 15 sends a response (a port assignment response) of the completion of the port forward setting (step 3) and performs a registration in the port mapping table 14a (step 4). If the port assignment cannot be performed at the step 2, a response (a port assignment disable response) that the port forward setting cannot be performed is sent (step 5) and the processing returns to the step 1 and stands by. At this time, the port number and IP address of the CP 4 to be registered in the port mapping table 14a together with the external port number is described in port forward setting request packet data. These can also be fetched from a TCP/IP header region for the port forward setting request.

Next, a setting procedure for automatically setting the lower router 3 will be described with reference to FIG. 4. In FIG. 4, the presence of the upper router 2 is confirmed (step 11) and the processing ends exactly if the confirmation of the presence is not performed. If the confirmation of the presence is performed, the presence of the upper router 2 is confirmed depending on (1) whether or not the WAN side IP address is a private address, (2) the presence of a response when a packet is multicast or broadcast into the WAN side, or (3) the contents of a response sent from an external server after the transmission of a packet to a default gateway (step 12). If the upper router presence confirming means 18 decides that the upper router 2 is present (step 13), the presence of the upper router 2 is recorded on a flag (step 14).

If the port forward setting request based on the UPnP standard is received from the CP 4 (step 15), then, it is decided whether the presence of the upper router 2 is stored in the flag (step 16). As a result of the decision, if the presence of the upper router 2 is stored in the flag, the same operation as the port forward setting request received from the CP 4 is performed over the upper router 2 (step 17). If the port forward setting for the upper router 2 is successful (step 18), the port forward setting based on the port forward setting request received from the CP to a self router is executed (step 19). If both of the port forward setting operations in two stages are successful (step 20), a notice of "successful (the port assignment request is accepted" is sent to the CP 4 (step 21). If either of them fails, a notice of "failure (the port assignment request is rejected)" is sent to the CP 4 (step 22). If it is decided that the upper router 2 is not present at the step 13, the port forward setting request is not relayed to the upper router 2 but the port forward setting is performed for only the self router and a notice of a result is sent to the CP 4.

The presence of the upper router 2 is recorded on the flag and it is decided whether or not a transfer to the upper router 2 is to be performed when the port forward setting request is received from the CP 4. The reason is that a response processing for the CP 4 is to be performed at a high speed.

Accordingly, a processing of updating the presence flag of the upper router 2 is required, and the confirmation of the presence of the upper router 2 is executed when the port forward setting request is not sent from the CP 4 (step 16). In the case in which a delay is permitted for a processing time or the case in which the newest information is always required, the confirmation of the presence of the upper router 2 may be performed at each time.

While the port forward setting request in the UPnP operation has been described, this is not restricted but another UPnP operation can be performed in the same procedure. A large number of operations such as the deletion or reference of the port forwarding are defined in the UPnP operation in accordance with the UPnP standard. All of these UPnP operations can be relayed to the upper router 2, and the UPnP operation for the upper router 2 is performed at each time and the set contents of the self router and the upper router 2 can be decided to be synchronized with each other. Referring to a request capable of being responded by only the information of the self router such as the confirmation of the contents, therefore, it is also possible to prevent the UPnP operation from being transferred to the upper router 2. Referring to a value to be dynamically changed such as the outer IP address of the lower router 3, it is possible to give an inquiry to the upper router 2 by the UPnP operation at each time for an inquiry sent from the CP 4 by the UPnP operation, thereby replying the newest value. It is also possible to store a result of the inquiry sent periodically to the upper router 2, thereby returning a stored value.

The periodic inquiry processing can be utilized for the confirmation of the presence of the upper router 2. For example, in the case in which a response to the periodic inquiry is not sent, it is decided that the upper router 2 disappears from the network. In this case, if a response is not obtained after the inquiry is repeated plural times (three times) again at a time interval without a decision based on a one-time non-response, it is decided that the upper router 2 disappears and the flag is reset.

Based on the flow charts of FIGS. 5A and 5B, subsequently, description will be given to a procedure in which the upper router presence confirming means 18 of the lower router 3 according to the first embodiment confirms the presence of the upper router 2. In FIG. 5A, the presence is confirmed by using the methods (1) and (2). In FIG. 5B, the presence is confirmed by using the methods (1) and (3).

In FIG. 5A, first of all, it is checked whether or nor a normal connection is performed (for example, a DHCP mode or a static mode) (step 31). In the case in which a PPPoE connection is to be performed, the WAN side serves as a PPPoE station and a router fulfilling an NAT function is not present. For this reason, there is a possibility that the upper router 2 might be present only in case of the normal connection such as the DHCP mode or the static mode. At a step 31, accordingly, the upper router 2 is not present when the normal connection is not performed. If the normal connection is performed, next, it is checked whether or not the WAN side IP address is a private address (step 32). If the WAN side IP address is the private address to be used in a primate network, it can be supposed that an upper network is connected to the WAN such as the internet 1 through another router. If the WAN side IP address is not the private address, the processing proceeds to a step 34 in which a router discovery packet is transmitted through a unicast to a default gateway, and it is checked whether or not a response is obtained (step 35). If the response is obtained, it is decided that the upper router 2 is present. Consequently, the upper router 2 is determined on a basis which will be described below (step 38). If the response is not obtained, the processing proceeds to a step 39 in which it is decided that the upper router 2 is not present.

On the other hand, if the WAN side IP address is the private address at the step 32, the router discovery packet is multicast or broadcast into the WAN side and it is checked whether or not a response is obtained (step 33).

If the response is sent to the router discovery packet, it is decided that the upper router 2 is present (step 36). If the response is not obtained, the processing proceeds to a step 37 in which it is decided that the upper router 2 is not present. The multicast or broadcast at the step 33 is performed only when the WAN side IP address is the private address. For this reason, a useless traffic is not generated in the WAN. Although the unicast performed at the step 34 is transmitted to a global IP address, it might be directly transmitted to the internet 1. For this reason, only one person to be a receiving object is selected. The direct multicast or broadcast into the internet 1 gives his (or her) presence to a large number of people so that he (she) might come under attack. In the unicast transmission, the number of receivers is decreased and a packet is transmitted to the internet 1. Therefore, there is still a danger of the attack. Therefore, it is also possible to transmit the unicast only once to the global IP address, thereby reducing the danger.

If it is decided that the upper router 2 is present at the steps 36 and 38, the upper router 2 is determined based on a predetermined criterion between the default gateway and the discovered upper router 2. For example, when both of them are coincident with each other, the exact router is the upper router 2. If both of them are different from each other, a router responding earlier is determined as the upper router 2.

Moreover, only the default gateway may be used as the upper router 2 and the decision processing can be simplified. In this case, a router discovery packet may be transmitted to the default gateway through the unicast at the step 35.

Also when the WAN side IP address of the lower router 3 is not private, thus, the router discovery packet is transmitted to the default gateway so that the presence of the upper router 2 corresponding to the UPnP standard can be decided. Also in the case in which a port is closed in the upper router 2, therefore, it is possible to avoid the blocking of access given from the WAN side through the upper router 2 by performing the port forward setting over the upper router 2. For example, it is assumed that the upper router 2 constitutes a network of "60. 5. 4. 0/24" as a part of the WAN and the lower router 3 constitutes a network of "60. 5. 4. 0/27", and a web server (an external IP address of "60. 5. 4. 5/27") is connected to the lower router 3. Moreover, it is assumed that the upper router 2 is set to block the access of a well-known port 80 (http port). In such a state, even if the IP address of the web server and the port 80 are designated from a client terminal (for example, an external IP address "60. 5. 5. 2") connected to another network on the WAN side to give access, the access is rejected through the upper router 2. If the upper router 2 is a UPnP standard compatible router, the port forward setting is dynamically performed by the lower router 3 according to the first embodiment. Therefore, the access from the client terminal to the web server is port forwarded to the lower router 3 through the upper router 2 so that the problem of the access rejection can be avoided. A router put generally on the market is set to close most of external ports in an initial state. Although the problem of the access rejection is apt to arise, therefore, it can be prevented.

Next, description will be given to a procedure for confirming the presence of the upper router 2 described in FIG. 5B. When the lower router 3 transmits a packet to a server managed by a router manufacturer (step 41), the server includes a source IP address and a source port number of the received packet and transmits them. Upon receipt of the returned packet, the router compares an IP address and a port number which are written in the same returned packet with its own IP address and the transmitted port number (step 42), and decides whether or not both of them are coincident with each other (step 43). If both of them are coincident with each other, it is decided that the router is not present in an upper order (step 44). If both of them are different from each other, it can be supposed that the default gateway is the upper router 2 and the IP address and the port number have been changed (step 45). Consequently, a router discovery packet or a UPnP operation request packet are transmitted to the default gateway (step 46). If a normal response is sent, it is decided that the upper UPnP router is present (step 47). If the response is not sent, it is decided that the router is present in the upper order and is not the UPnP router. Subsequently, the UPnP operation (port forward setting request) from the CP 4 is not relayed. Thus, the possibility of the presence of the router is confirmed, and furthermore, the UPnP operation or the router discovery packet is transmitted through the unicast. Consequently, a multicast transmission does not need to be performed and an influence on a network traffic is reduced.

Subsequently, description will be given to a procedure for setting an external port number which is to be performed by a lower UPnP router and an upper UPnP router in a state in which the presence of the upper UPnP router is confirmed.

The assignment of the external port number in FIG. 6A is performed in a first assignment mode for sending a request for port forward setting from the CP 4 to the lower router 3 in accordance with the UPnP standard and for performing port forward setting over the same external port number also in the upper router 2. As shown in FIG. 6A, the CP 4 gives a port assignment request to the lower router 3 in port numbers P1 to P5 in ascending order from P1. Description will be given on the assumption that the port numbers P1 to P3 cannot be assigned and only the port numbers P4 and P5 can be assigned in the upper router 3. Whether the port number cannot be assigned is decided depending on whether the port number has already been assigned to the port mapping table, whether the port number is assigned for using other functions and whether the port number is set to be unassigned.

Since the port number P1 cannot be assigned, the CP 4 sequentially transmits a port forward setting request for the port numbers P2 and P3. The lower router 3 gives a port forward setting disable response (a notice of setting disable). Next, the CP 4 transmits a port forward setting request designating the port number P4. Since the port number P4 can be assigned, the lower router 3 transmits a port forward setting request packet designating the port number P4 to the upper router 2. In FIG. 6A, the port numbers P2 and P4 of the upper router 2 can be assigned. Therefore, the upper router 2 assigns the port number P4 to give a response of this purport (a notice of a setting completion).

If the assignment cannot be performed, the lower router 3 receives a port forward setting disable response from the upper router 2 and gives a notice of "the port number P4 cannot be subjected to the port forward setting" to the CP 4. This operation is repeated until the same port number is assigned between the lower router 3 and the upper router 2. When the port forward setting of a common external port number is completed by the lower router 3 and the upper router 2, the lower router 3 gives the CP 4 a notice of the port forward setting (a notice of successful setting) and the port forward setting is ended by the lower router 3 and the upper router 2 in accordance with the UPnP standard.

Subsequently, the assignment of the external port number in FIG. 6B is set in a second assignment mode in which a request for the port forward setting in accordance with the UPnP standard is sent from the CP, and an external port number designated by the CP4 is assigned to the upper router 2 and a different external port number can also be assigned to the lower router 3. As shown in FIG. 6B, the CP 4 performs the port forward setting designating the port number P1 over the lower router 3. In the lower router 3, the port numbers P2, P4 and P5 can be assigned. For this reason, P1 cannot be assigned to the lower router 3. However, P2 can be used. Therefore, the lower router 3 transmits the port forward setting request in such a manner that "the external port number P4 of the upper router 2 is transferred to the external port P2 of the lower router 3" to the upper router 2. By this setting operation, a packet transmitted from the computer terminal 5 on the internet to the port P4 of the IP address of the upper router 2 is transferred to the port P2 of the lower router 3 through the upper router 2, and the lower router 3 performs a transfer to the CP 4. In case of the second assignment mode, even if there is a port number which cannot be used in the lower router 3, it is possible to assign an external port number to be used by the CP 4.

While there has been described the port assignment mode 2 requested from the CP 4 connected to the LAN side of the lower router 3, an application to be operated over the lower router 3 can be caused to have the same function.

For example, it is necessary to allocate an external port number for each IP camera in order to connect an IP camera (a network camera) to be the follower of the lower router 3 and to cause the IP camera to have a web server function, and to create a web page displaying link information for the IP camera in a list. In a router having this function, port numbers to be allocated to the IP camera are reserved in such a manner that another application does not utilize the same port numbers. In the case in which routers of the same type are superposed in two stages for use, accordingly, the lower router 3 cannot utilize the UPnP to allocate the reserved port number as the external port number of the port forwarding because the reserved port is assigned to a self machine. Therefore, the lower router 3 performs port mapping with a port number getting out of the reservation range of the upper router 2. For example, in the case in which a reservation is performed from "60001" to "60030", the lower router 3 sets a transfer for an external port number "60031" of the upper router 2 in such a manner that a port number "60001" of the lower router 3 is subjected to the port forwarding.

Description will be given to the port forwarding in an arrival at the upper router 2 from the external terminal through the internet 1 while the port forward setting in accordance with the UPnP standard is performed. FIG. 7A shows the case of the first assignment mode. There will be considered the case in which a packet of "http://60. 5. 4. 3 : 8000" arrives at the upper router 2 having an external IP address of "60. 5. 4. 3" as shown in FIG. 7A. When a port forward setting request based on the UPnP standard, that is, "External port number: 8000, WAN side IP address: 192. 168. 0. 2, Internal port number: 80, Protocol: TCP" is transmitted from the CP 4 to the lower router 3, the lower router 3 transmits, to the upper router 2, a port forward setting request based on the UPnP standard, that is, "External port number: 8000, WAN side IP address: 192. 168. 1. 2, Internal port number: 8000, Protocol: TCP".

The upper router 2 receiving the request sets, into the router, the port forward setting based on the request sent from the lower router 3 and returns a notice of a success to the lower router 3. The lower router 3 receiving the notice of success sets, into the router, the port forward setting based on the request sent from the CP 4. By the port forward setting, a TCP packet "60. 5. 4. 3 : 8000" directed to the upper router 2 is transferred as "192. 168. 1. 2 : 8000" to the lower router 3 in accordance with the port forward setting of the upper router 2, and is transferred as "192. 168. 0. 2 : 80" directed to the CP 4 in accordance with the port forward setting of the lower router 3. By this function, if a notice that a connecting destination address to the CP 4 has a port of "60. 5. 4. 3 : 8000" is sent via a server to the computer terminal 5 on the internet 1, the CP 4 can perform a P2P connection. In other words, also in the case in which the lower router 3 and the upper router 2 are connected to each other in two stages, the two routers can be treated as one router.

The http is one protocol on the TCP. If a set parameter for the port forward setting is the TCP, therefore, protocols such as SMTP and FTP are included in addition to the http.

Next, FIG. 7B shows the case of the second assignment mode. There will be considered the case in which a packet of "http://60. 5. 4. 3 : 8000" arrives at the upper router 2 having the external IP address "60. 5. 4. 3".

When the port forward setting request based on the UPnP standard, that is, "External port number: 8000, Client IP address: 192. 168. 0. 2, Internal port number: 80, Protocol: TCP" is transmitted from the CP 4 to the lower router 3, the lower router 3 cannot use No. 8000 as its own external port and therefore uses No. 8081 port to transmit, to the upper router 2, the port forward setting request based on the UPnP standard, that is, "External port number 8000, WAN side IP address; 192. 168. 1. 2, Internal port number: 8081, Protocol:

TCP". The upper router 2 receiving this request sets, into the router, the port forward setting based on the request sent from the lower router 3 and returns a notice of a success to the lower router 3. The lower router 3 receiving the notice of success sets, into the router, the port forward setting based on the request sent from the CP4. By these port forward setting operations, the TCP packet of "60. 5. 4. 3 : 8000" directed to the upper router 2 is transferred as "192. 168. 1. 2 : 8081" to the lower router 3 in accordance with the port forward setting of the upper router 2, and is transferred as "192. 168. 0. 2 : 80" directed to the CP 4 in accordance with the port forward setting of the lower router 3. By this function, if a notice that a connecting destination address: port directed to the CP4 is "60. 5. 4. 3 : 8000" is given via the server through the computer terminal 5 on the internet 1, the CP 4 can perform the P2P connection.

Also in case of the second assignment mode, in the same manner as in the first assignment mode, two routers can be treated as one router when the lower router 3 and the upper router 2 are connected to each other in two stages.

In the port forward setting in accordance with the UPnP standard described above, the lower router 3 is set to be a UPnP router and the port forward setting is performed from the CP 4 to the lower router 3 as shown in FIG. 8A. The lower router 3 assigns a port number to the port forward setting request sent from the CP 4, and furthermore, performs the port forward setting over the external port number, the internal port number, the IP address and the protocol. Furthermore, the lower router 3 serves to give the upper router 2 a notice of the external port number, the internal port number, the IP address and the protocol and to perform the port forward setting also in the upper router 2.

On the other hand, the upper router 2 can also be set to be the UPnP router, thereby performing the port forward setting from the CP 4 to the upper router 2 as shown in FIG. 8B. The upper router 2 can assign a port number in response to a port assignment request for an external port number given from the CP 4, and furthermore, can perform the port forward setting over the external port number, the internal port number, the IP address and the protocol.

In this case, when the CP 4 executes the port forward setting in accordance with the UPnP standard for the upper router 2, the lower router 3 shown in FIG. 8B transfers a packet for the port forward setting in accordance with the UPnP standard. Accordingly, the packet is monitored at a port for performing the port forward setting, and the external port number, the internal port number, the IP address and the protocol over which the port forward setting is to be performed are read, and the data thus read are analyzed to perform the port forward setting over the lower router 3 itself. In FIG. 8B, it is necessary to directly perform the UPnP operation from the CP 4 to the upper router 2. For this purpose, the CP 4 is to discover the presence of an upper UPnP router. When the lower router 3 receives a UPnP router discovery packet from the CP 4, therefore, the lower router 3 returns the address/port number of the UPnP router to be described in a response packet as the IP address/port number of the upper router 2. At this time, the CP 4 sometimes checks whether or not the source IP address of the returned packet is identical to the contents of the response packet. Therefore, the source IP address of the returned packet can be set to be the IP address of the upper router 2.

Thus, the lower router 3 monitors all of the UPnP operations to be performed for the upper router 2 by the CP 4 and performs necessary port forward setting to itself, and at the same time, performs a processing of rewriting a transfer destination IP address of the port forward setting to itself. If the information of the LAN side network of the lower router 3 is given as routing information to the upper router 2, alternatively, the upper router 2 can transmit a packet directed to the CP 4 to the lower router 3 even if the transfer destination IP address of the UPnP operation to be performed by the CP 4 is not rewritten.

As described above, the packet arriving at the WAN side of the upper router 2 is transferred to the lower router 3 by the port forward setting performed by the CP 4, and the lower router 3 executes a transfer to the CP 4 through the transfer setting performed by itself. By the above operation, it is possible to expect the same advantages as those in the case in which a router subjected to the UPnP operation by the CP 4 is the lower router 3 as shown in FIG. 8A.

Thus, the router according to the first embodiment performs the port forward setting in accordance with the UPnP standard also when the upper router 2 is present. Consequently, it is possible to perform an arrival from the WAN such as the internet 1 to the CP 4 to be the follower of the router. When the router according to the first embodiment is connected to the network, moreover, it is automatically decided whether or not the router is present in an upper order and the lower router 3 also performs the UPnP operation from the CP 4 over the upper router 2. Consequently, the lower router 3 and the upper router 2 can be treated as one router.

Second Embodiment

A second embodiment of the invention will be described below with reference to each drawing.

Figure 9:
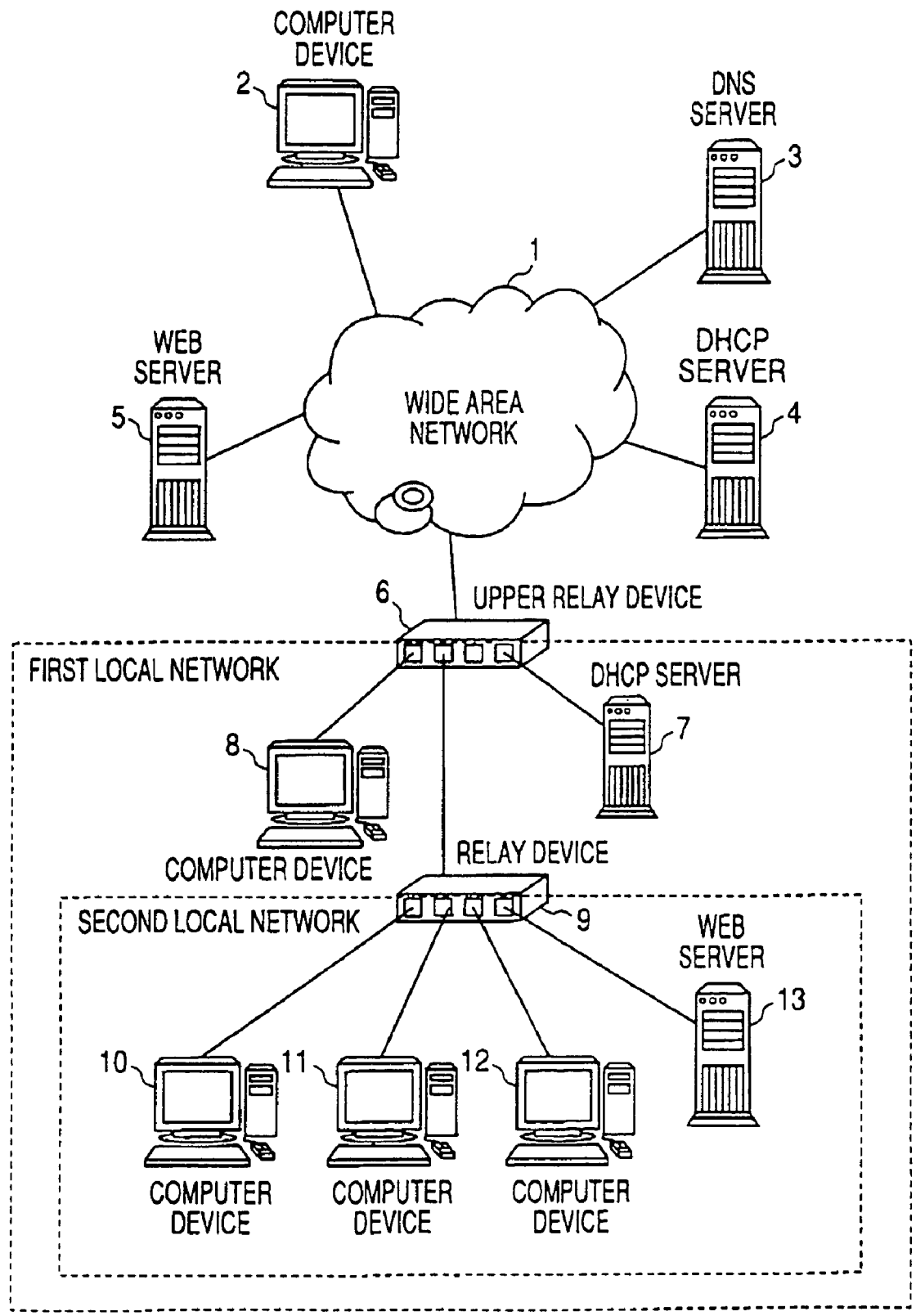
FIG. 9 is a view showing the structure of a network system including a relay device according to a second embodiment of the invention.

FIG. 9 is a view showing the structure of a network system including a relay device according to the second embodiment of the invention.

In FIG. 9, a reference numeral 1 denotes a wide area network such as an internet, and a reference numeral 2 denotes a computer device (hereinafter referred to as a PC) connected to the wide area network 1. The computer device 2 has general purpose browser means and can give access to a web server 5 which will be described below, thereby displaying a web page.

A reference numeral 3 denotes a DNS (Domain Name System) server which relates an IP address assigned to an apparatus connected to the wide area network 1 and a host name corresponding thereto and stores them, and retrieves the stored information when receiving a request for the IP address of an apparatus having a certain host name through the wide area network 1 from a client, and transmits the IP address for the requested host name to a client.

A reference numeral 4 denotes a DHCP server which serves to dynamically assign an IP address based on a request sent from a client terminal connected to the wide area network 1. Moreover, the DHCP server 4 recovers an IP address assigned dynamically when a client terminal is removed from the wide area network 1.

A reference numeral 5 denotes a web server which provides a web page to access given from the computer device 2. The web page is described in a mark-up language such as HTML and includes a program such as Java (registered trademark) in some cases.

A reference numeral 6 denotes an upper relay device connected to the wide area network 1 (which will be hereinafter referred to as the upper relay device because a distinction from a relay device 9 to be described below is caused to be clear) which constitutes a first local network to be a follower. A reference numeral 7 denotes a DHCP server connected to the first local network and a reference numeral 8 denotes a computer device (hereinafter referred to as a PC) connected to the first local network. The first local network is constituted by the DHCP server 7 and the PC 8. It is possible to perform a communication between the PC 8 connected to the first local network and the PC 2 connected to the wide area network 1 through the upper relay device 6.

The DHCP server 7 is connected to the first local network and dynamically assigns the IP address to the upper relay device 6 and the PC B. The PC 8 also performs an operation for a DHCP client. The range of an IP address to be assigned to an apparatus in the first local network by the DHCP server 7 is preset and the IP address is assigned in accordance with the contents of the set. The assignment processing is executed by sending a request from an apparatus connected to the first local network and the IP address is dynamically assigned to the apparatus requested by the DHCP server 7.

A reference numeral 9 denotes a relay device (a router in the first embodiment of the invention), and reference numerals 10 to 12 denote computer devices (hereinafter referred to as PCs). The relay device 9 sets the PCs 10 to 12 and a web server 13 to be followers, constituting a second local network. The PCs 10 to 12 and the web server 13 are operated as DHCP clients. More specifically, when the PCs 10 to 12 and the web server 13 are connected to the second network, a request for the assignment of the IP address is given to a DHCP server portion 24 which will be described below, and an IP address assigned by the DHCP server portion 24 is stored as the IP address of a self device in response to the request.

Figure 10:
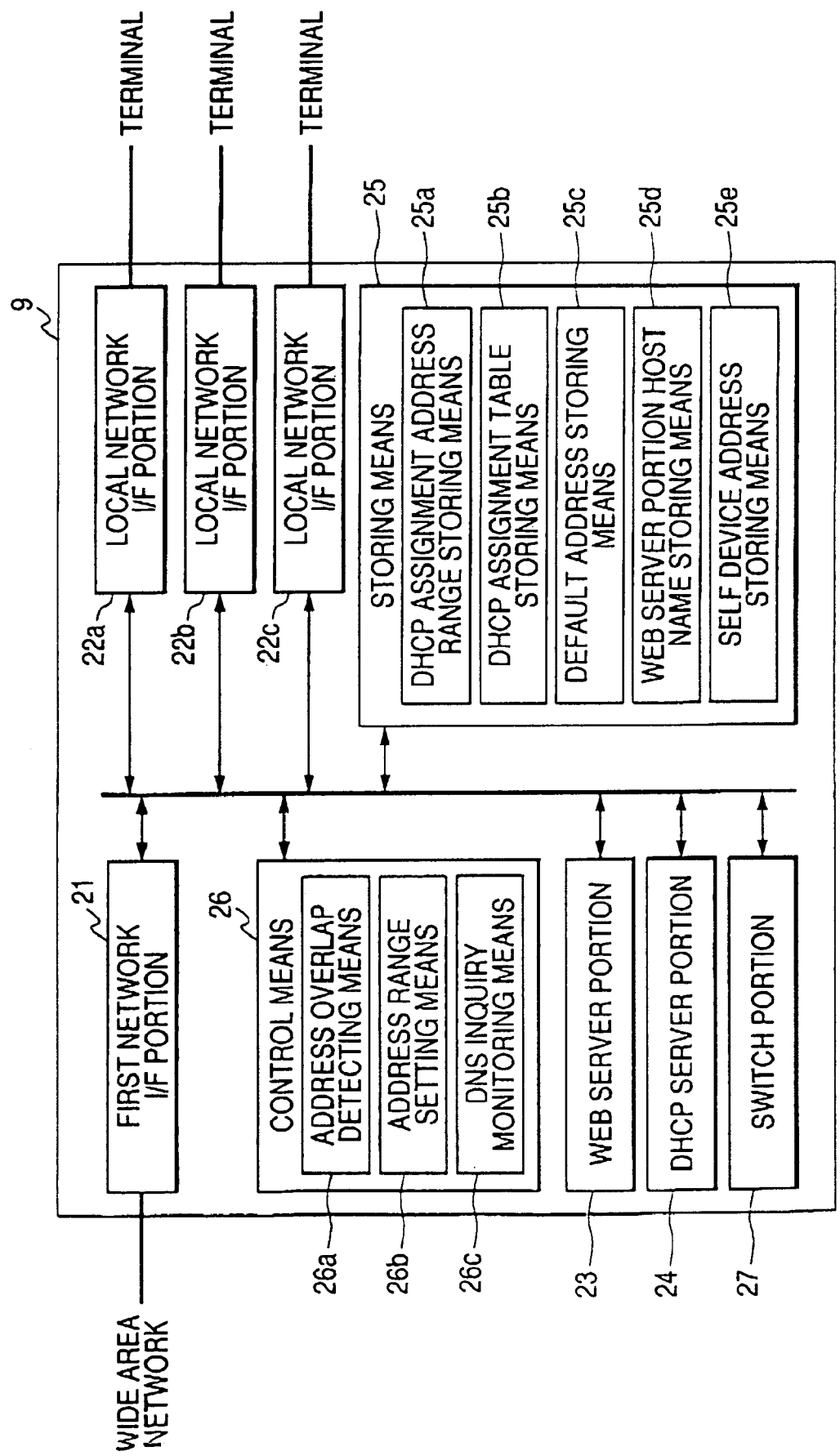
FIG. 10 is a diagram showing the internal structure of the relay device according to the second embodiment of the invention.

Next, the internal structure of the relay device according to the second embodiment of the invention will be described with reference to FIG. 10. FIG. 10 is a diagram showing the internal structure of the relay device according to the second embodiment of the invention. In FIG. 10, 21 denotes a first network I/F portion to be connected to the first network, which can be connected to the first local network to be the follower of the wide area network 1 and the upper relay device 6 based on a protocol such as TCP/IP.

Reference numerals 22a to 22c denote local network I/F portions which can connect the PCs 10 to 12 and the web server 13 and constitute the second local network together with apparatuses connected to the local network I/F portions 22a to 22c including the relay device 9 (including the case in which the connection is performed through a hub) as shown in FIG. 1.

A reference numeral 23 denotes a web server portion which is constituted to be accessible through the first network I/F portion 21 and the local network I/F portions 22a to 22c.

For example, when the IP address of the first network I/F portion 21 is assigned to "192. 168. 1. 1" by the DHCP server 7 and a packet designating "Http://192.168.1.1:80" is transmitted from the PC 8, the transmission packet is routed to the relay device 9 through the upper relay device 6. Since the transmission packet is accessed with a port number of 80, it is received by the web server portion 23 (the port number of 80). When access is given from the PC 8, the web server portion 23 gives control means 26 which will be described below a request of an operation for sending a response of a predetermined web page or changing the set contents of the relay device 9 in accordance with the contents of the access.

A reference numeral 24 denotes a DHCP server portion which registers one of IP addresses which are not set to a DHCP assignment table 25b which will be described below upon receipt of an IP address assignment request from the apparatus connected to the second network, and returns a response of IP address assignment OK to the same apparatus.

A reference numeral 25 denotes storing means which stores programs and various set information. The storing means includes each storing means which will be described below.

A reference numeral 25a denotes DHCP assignment address range storing means which pre-stores the range of an IP address which can be dynamically assigned to the apparatus to be a follower by the DHCP server portion 24. For example, in the case in which a range of "192. 168. 0. 1" to "192. 168. 0. 254" is set to be assigned, the contents of "192. 168. 0. 0/24" are stored in the DHCP assignment address range storing means.

A reference numeral 25b denotes DHCP assignment table storing means which serves to store an IP address assigned to a terminal to be a follower by the DHCP server portion 24 together with the MAC address of the terminal within an address range stored in the DHCP assignment address range storing means 25a. The DHCP assignment table storing means 25b is constituted as shown in FIG. 13, for example. FIG. 13 shows the contents of the DHCP assignment table of the relay device according to the second embodiment of the invention. FIG. 13 indicates that an IP address "192. 168. 0. 2" is assigned to the relay device 9 and IP addresses "192. 168. 0. 3" to "192. 168. 0. 5" are assigned to the PCs 10 to 12, respectively.

A reference numeral 25c denotes default address storing means. In the case in which a packet transmitted from the second local network side is directed to the port number of 80 at an IP address stored in the default address storing means 25c, the data of the transmission packet are sent to the web server portion 23. The contents of the default address storing means 25c are preset, and the contents stored in the default address storing means 25c are not changed even if the contents stored in the DHCP assignment address range storing means 25a are varied. When the contents stored in the DHCP assignment address range storing means 25a are varied, accordingly, the address of the relay device 9 itself is changed and the address of the web server portion 23 is not changed. The address of the web server portion 23 is effective for only an access given from the second local network side and is not used for access given from the first local network.

A reference numeral 25d denotes web server portion host name storing means which stores the host name of the web server portion 23. The contents are preset and may be changed by a predetermined operation.

A reference numeral 25e denotes self device address storing means for storing the IP address of a self device, that is, the relay device 9 itself. In an initial state, the smallest number in the address range stored in the DHCP assignment address range storing means 25a is assigned to the relay device 9 itself. For example, in the case in which "192. 168. 0. 0/24" is set to the DHCP assignment address range storing means 25a in an initial state, "192. 168. 0. 1" is assigned to the self device address storing means 25e. Also when the address range stored in the DHCP assignment address range storing means 25a is changed, the smallest number is assigned to the relay device 9 itself.

A reference numeral 26 denotes control means for controlling the whole relay device 9 which has various control means such as address overlap detecting means 26a, address range setting means 26b and DNS inquiry monitoring means 26c. 27 denotes a push type switch portion which will be described in detail in a third embodiment.

The address overlap detecting means 26a serves to decide whether or not an address range detected by address detecting means (not shown) and an address range stored in the DHCP assignment address range storing means 25a are coincident or overlap with each other when the address detecting means detects the address range of the first local network.

When the address overlap detecting means 26a decides that the address ranges overlap with each other, the address range setting means 26b changes the address range stored in the DHCP assignment address range storing means 25a so as not to overlap with the address range detected by the address detecting means.

The DNS inquiry monitoring means 26c serves to monitor an inquiry of an address (for example, a DNS query) for a host name which is transmitted from the apparatuses such as the PCs 10 to 12 connected to the second local network to the DNS server, and decides whether or not a host name contained in the inquiry is coincident with a host name stored in the web server portion host name storing means 25d when detecting the inquiry.

Figure 11:
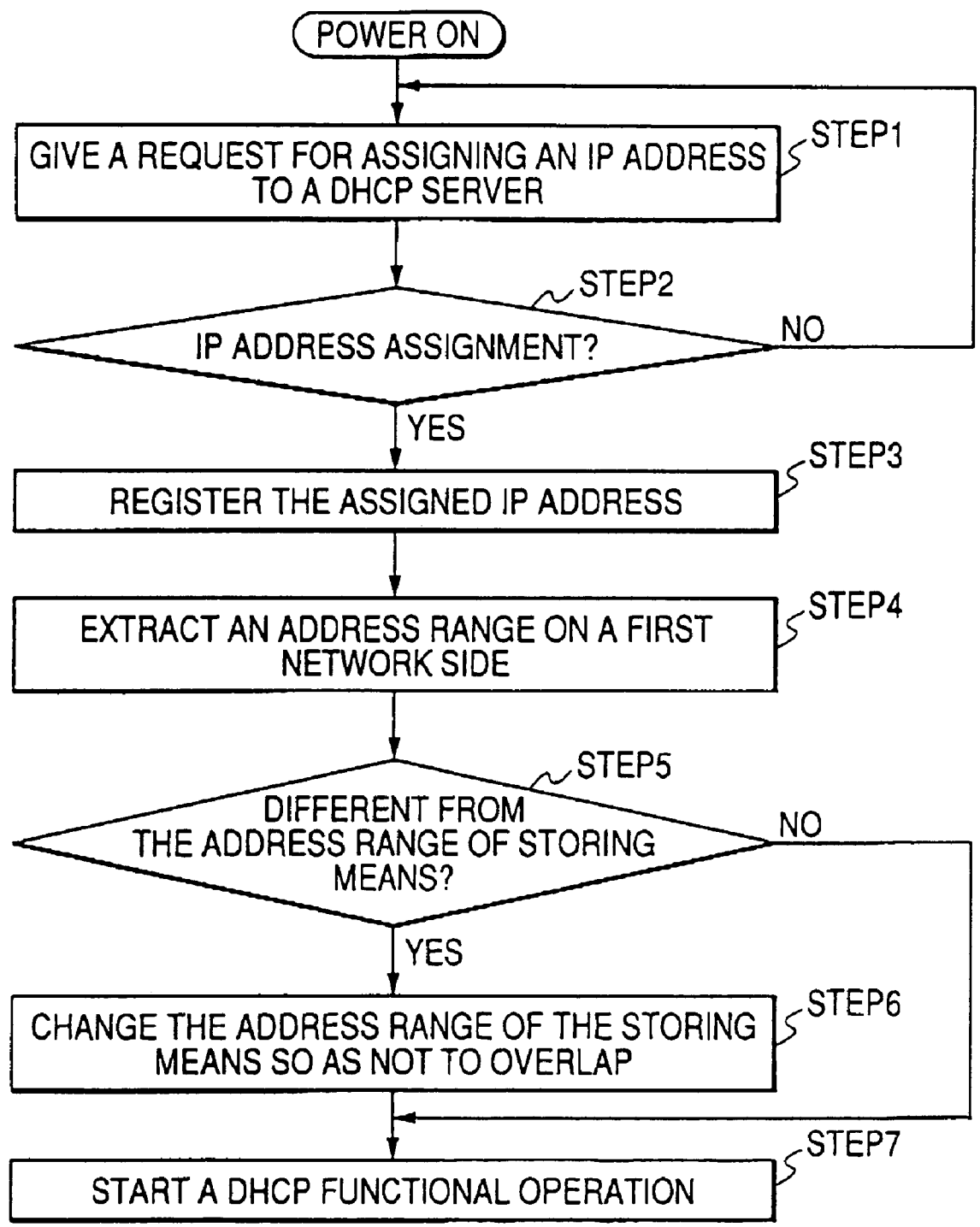
FIG. 11 is a flow chart showing a change in the address range of the relay device according to the second embodiment of the invention.

The operation of the relay device 9 having the above structure will be described with reference to a flow chart of FIG. 11. Reference will also be made to FIGS. 9 and 10. FIG. 11 is a flow chart showing a change in the address range of the relay device according to the second embodiment of the invention.

First of all, when the power supply of the relay device 9 is turned ON, the control means 26 sends a request for assigning an IP address on the first network I/F portion side to the DHCP server 7 which is preset to the storing means 25 (step 1). Then, it is decided whether or not the assignment of an IP address is given from the DHCP server 7 (step 2). If the assignment of the IP address or a subnet mask is given, the IP address and the subnet mask to be assigned are registered, in the storing means 25, as an IP address on the first network I/F portion 21 side (step 3).

The address detecting means (not shown) fetches the IP address and the subnet mask on the first network I/F portion 21 side which are stored in the storing means 25, extracts the address range of the first local network, and gives a notice of the address range to the address overlap detecting means 26a (step 4). The address overlap detecting means 26a decides whether or not the address range stored in the DHCP assignment address range storing means 25a and the IP address range detected and extracted by the address detecting means overlap or are coincident with each other (step 5). For example, in the case in which the assignment of an IP address "192. 168. 0. 2" and a subnet mask "255. 255. 255. 0" is given from the DHCP server 7, the address detecting means identifies that a range of "192. 168. 0. 0/24" ("192. 168. 0. 0" to "192. 168. 0. 255") is set within the IP address range of the network on the first network I/F portion 21 side. If a range of "192. 168. 0. 192/26" ("192. 168. 0. 192" to "192. 168. 0. 255") is set to the DHCP assignment address range storing means 25a, the address overlap detecting means 26a decides that the address range overlaps in the portion of "192. 168. 0. 192/26". On the other hand, if a range of "192. 168. 1. 0/24" ("192. 168. 1. 0" to "192. 168. 1. 255") is set to the DHCP assignment address range storing means 25a, the address ranges do not overlap with each other. Therefore, the address overlap detecting means 26a decides that the address ranges do not overlap with each other.

In the case in which the address overlap detecting means 26a decides that the address ranges overlap with each other, the address range stored in the DHCP assignment address range storing means 25a is changed to an address range which does not overlap with the first local network in order to prevent the address ranges from overlapping with each other (step 6). For example, in the case in which the IP address range of the network on the first network I/F portion 21 side is "192. 168. 0. 0/24" and a range of "192. 168. 0. 192/26" is set to the DHCP assignment address range storing means 25a, the range of the DHCP assignment address range storing means 25a is changed to "192. 168. 1. 192/24" and the IP address of the DHCP assignment table storing means 25b is changed. In the case in which at least two first network I/F portions 21 are provided and are connected to different networks from each other, the range of the DHCP assignment address range storing means 25a is changed by the address overlap detecting means 26a in order not to overlap with the address ranges of the at least two networks.

After the step 6 or it is decided that the address ranges do not overlap with each other at the step 5, the DHCP server portion 24 is turned ON. If an IP address assignment request is sent from the PCs 10 to 12 to be the DHCP clients after the DHCP server portion 24 is turned ON, an unassigned IP address is retrieved from the DHCP assignment table storing means 25b, the PCs 10 to 12 are caused to correspond to the IP address thus retrieved and the same IP address is thus registered in the DHCP assignment table storing means 25b, and furthermore, an assignment for the IP address is returned to the PCs 10 to 12 (step 7).

In the case in which the assignment of the IP address is not performed at the step 2, moreover, a request for an IP address assignment to the DHCP server is sent at a predetermined interval.

At the same time that the DHCP assignment table 25b is changed, the IP address of the relay device 9 itself is automatically assigned to the DHCP assignment table storing means 25b.

Although the description has been given on the assumption that the IP address on the first network I/F portion 21 side is dynamically acquired with the relay device 9 to be the DHCP client in the second embodiment, it is also possible to decide whether or not the IP address is set by a user and to then perform the operations from the steps 4 to 7.

While the address range of the network on the first network I/F portion 21 side is decided based on the subnet mask and the IP address, furthermore, the decision may be performed depending on CIDR (Classless Inter-Domain Routing).

In addition, the address overlap detecting means 26a may perform the operation at a predetermined interval after the power supply of the relay device 9 is turned ON or may be subjected to interruption starting when the self device address storing means 25e performs a rewrite.

As described above, in the relay device according to the first embodiment of the invention, an address which does not overlap with the address range of the first local network can be assigned to a terminal to be a follower. Moreover, the address range of the first local network is decided based on the subnet mask or the CIDR. Consequently, the decision can easily be performed.

Figure 12:
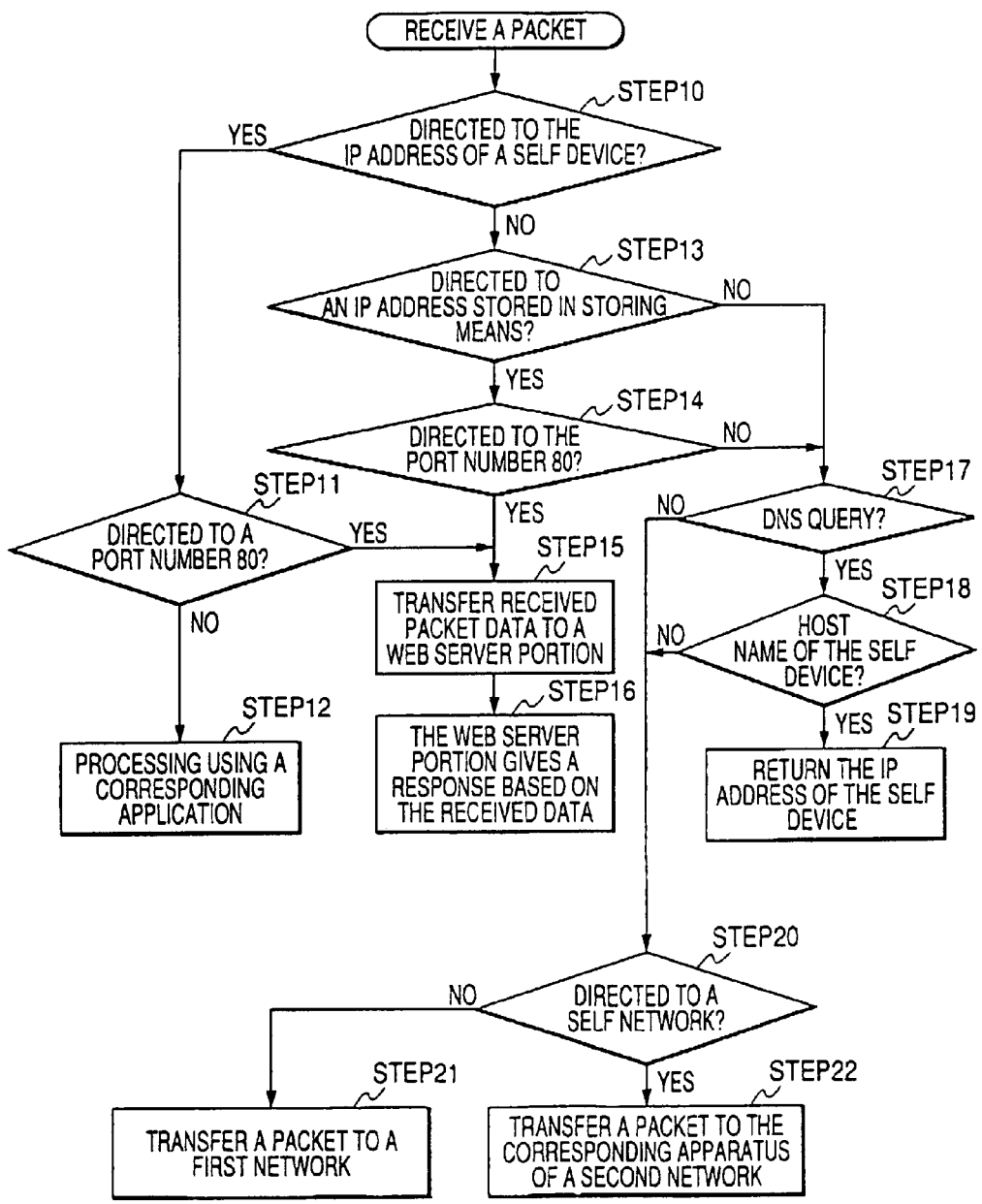
FIG. 12 is a flow chart showing the access of the relay device according to the second embodiment of the invention.

Next, an operation for giving access from the PCs 10 to 12 to the web server portion 23 of the relay device 9 will be described base on FIG. 12, and furthermore, with reference to FIGS. 9 and 10. FIG. 12 is a flow chart showing the access of the relay device according to the second embodiment of the invention.

When receiving a packet transmitted from the PC 10 through the local network I/F portions 22a to 22c, the control means 26 of the relay device 9 fetches a destination IP address contained in the header portion of the transmission packet and decides whether or not the destination IP address is identical to the IP address of the relay device 9 (step 10). The control means 26 decides whether or not the destination IP address is identical to the IP address of the relay device 9 depending on whether or not it is coincident with the IP address of a self device which is assigned to the DHCP assignment table storing means 25b. If the destination IP address of the transmission packet is identical to the IP address of the relay device 9, the control means 26 further fetches the destination port number of the transmission packet to decide whether or not the destination port number is identical to the port number (for example, No. 80) of the web server portion 23 (step 11). If the destination port number is identical to the port number of the web server portion 23, the control means 26 gives the contents of the transmission packet data to the web server portion 23. On the other hand, if the destination port number is not identical to the port number of the web server portion 23, the contents of the transmission packet data are given to an application corresponding to the same port number to perform a processing (step 12).

If the control means 26 decides that the destination IP address is not identical to the IP address of the relay device 9 at the step 10, it decides whether or not the destination IP address is identical to an IP address stored in the default address storing means 25c (step 13). If it is decided that the destination IP address is identical to the IP address stored in the default address storing means 25c, the destination port number of the transmission packet is thus fetched and it is decided whether or not the destination port number is identical to the port number (No. 80) of the web server portion 23 (step 14). If the destination port number is identical to the port number of the web server portion 23, the control means 26 gives the contents of the transmission packet data to the web server portion 23 (step 15) and the web server portion 23 performs an operation for transmitting a web page or setting the relay device 9 in accordance with the contents of a request contained in the data portion of the transmission packet (step 16).

If the destination IP address is not identical to the default IP address at the step 13 or the destination port number is not equal to the port number of the web server portion 23 at the step 14, the control means 26 decides whether or not the transmission packet is a DNS query depending on whether or not the destination port number is identical to a well-known port "53" (step 17). When deciding that the transmission packet is the DNS query, the control means 26 decides whether or not an inquiry host name stored in the data portion of the transmission packet is coincident with the host name of the web server portion (step 18). If they are coincident with each other, the IP address stored in the default address storage means 25c is transmitted as the response of the DNS query to the transmission source of the DNS query (step 19). The transmission packet to be transmitted as the response of the DNS query does not set, as a transmission source, the IP address of the self relay device 9 which is stored in the DHCP assignment table storing means 25b but sets, as the transmission source, the IP address stored in the default address storing means 25c and performs a transmission.

If they are not coincident with each other, the control means 26 decides whether or not the IP address is present in the DHCP assignment table storing means 25b in order to decide whether or not the IP address is directed to a self network (step 20). If it is decided that the IP address is not present, the transmission packet is transferred from the first network I/F portion 21 to the first network side (step 21). On the other hand, if it is decided that the destination IP address is present in the DHCP assignment table storing means 25b, the transmission packet is transferred to the corresponding local network I/F portions 22a to 22c in accordance with the DHCP assignment table storing means 25b (step 22).

The inside of the second network can also be constituted to be operated as a simple hub. In this case, the control means 26 of the relay device 9 does not receive a packet. For this reason, the processings of the steps 20 and 22 are not performed but the processing of the step 21 is exactly performed. More specifically, if it is decided that the packet is not the DNS query at the step 17 and if it is decided that the packet is not the host name of the self device at the step 18, the received packet is transferred to the first network.

Although the access to the default address which is not changed in the address range setting means 26b is restricted to the web server portion 23 in the foregoing, the web server portion is not limited but access to other ports may be processed by a corresponding application.

Moreover, access can be given to the web server portion 23 of the relay device 9 with a host name by simply storing only the host name without fixedly storing a default address. In a reverse case, similarly, access can be given to the relay device 9 at the default address. Thus, it is also possible to use either the IP address or the host name.

In addition, whether the DNS query includes a predetermined host name may be detected by causing the relay device 9 itself to have a DNS server function and performing the above processing over the access to the DNS server portion without monitoring the access to the DNS server 3. In this case, it is decided whether or not the destination IP address of the transmission packet is coincident with the IP address for the whole relay device 9 in place of the step 13. If they are coincident with each other, it is decided whether or not the IP address is the DNS query depending on a destination port number according to whether or not the inquiry host name contained in the transmission packet is coincident with the host name of the web server portion.

Also in the case in which the address range to be dynamically assigned to the apparatus connected to the local network side is changed by the address range setting means 26b as described above, an address for previously giving access to a self device is not changed. For this reason, access can be given to the relay device by using the same address. If a communication packet is transmitted with a predetermined host name from the apparatus connected to the second network (local network), moreover, the address of the relay device 9 can be obtained. Therefore, it is possible to avoid a situation in which the address on the second network side of the relay device 9 cannot be known. In the case in which the relay device is to be set from the apparatus connected to the second network, particularly, the setting itself becomes hard when the address of the relay device is dynamically changed. However, such a drawback can be eliminated.

Third Embodiment

While the address of the DHCP assignment address storing means 25a is changed by the address range setting means 26b when the address overlap detecting means 26a decides that the addresses overlap with each other in the second embodiment, the address range setting means 26b is not operated until a request is sent from the PC 10 to the relay device 9 even if the address overlap detecting means 26a decides that the addresses overlap with each other in a third embodiment of the invention. Specific description will be given.

Since the structure of a relay device according to the third embodiment of the invention is basically the same as that of FIG. 10 and only the operation of control means is different, description thereof will be omitted. 27 denotes a push type switch portion. When the switch portion is pushed, the address range setting means 26b is operated.

Figure 14:
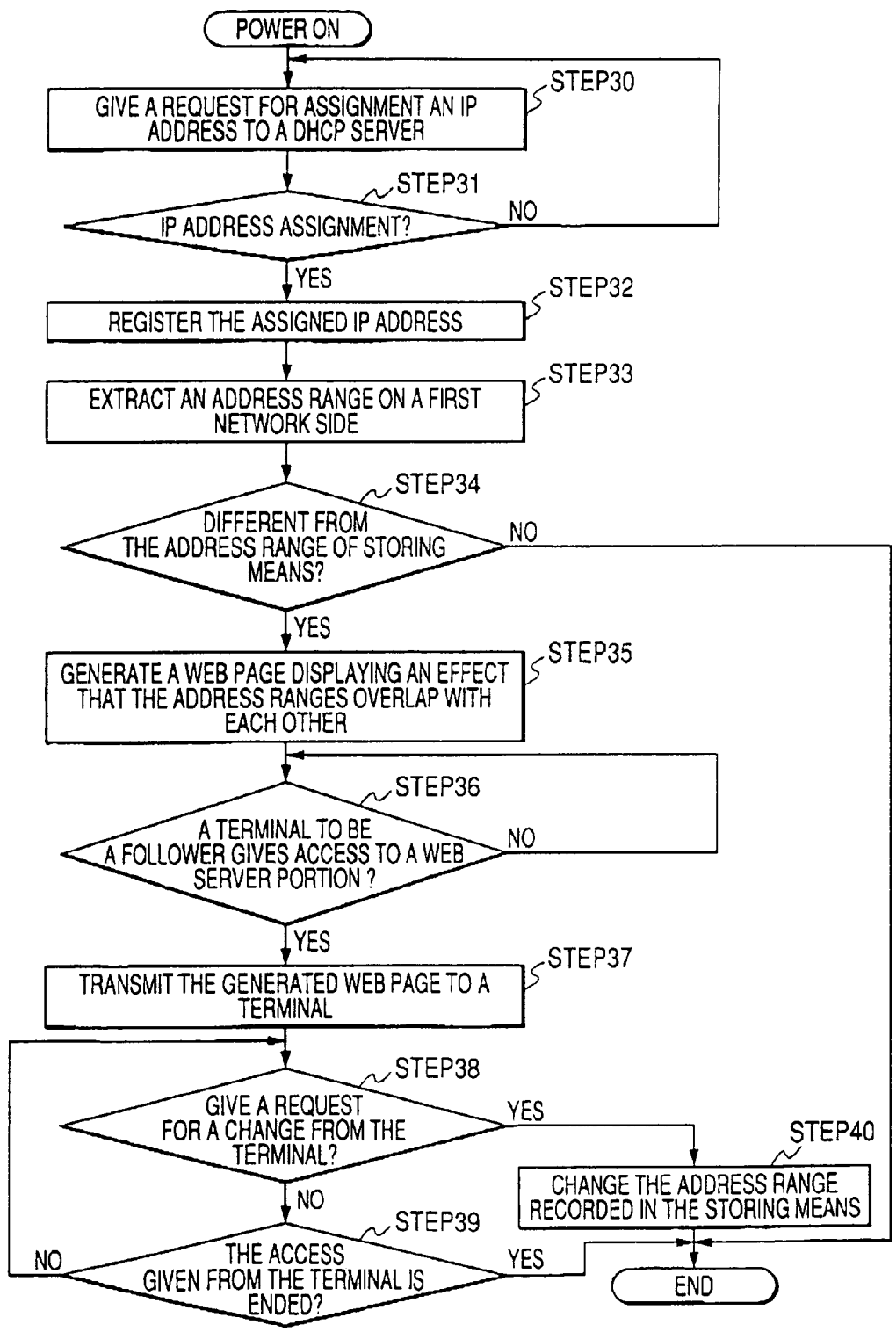
FIG. 14 is a flow chart showing a change in the address range of a relay device according to a third embodiment of the invention.

The operation of the relay device 9 will be specifically described by using a flow chart of FIG. 14. Reference will be made to FIGS. 9 and 10. FIG. 14 is a flow chart showing a change in the address range of a relay device according to the third embodiment of the invention, and FIG. 15 is a diagram showing the contents of a web page in the relay device according to the third embodiment of the invention. Since steps 30 to 34 correspond to the steps 1 to 5 respectively and the same operations are performed, description will be omitted.

If the address overlap detecting means 26a decides the overlap of address ranges and judges that the address ranges overlap with each other at the step 34, the control means 26 generates a web page (information for display) shown in FIG. 15 which can be displayed in a computer device (step 35). The web page is not generated in the detection of the overlap of the address ranges but can also be prestored in storing means 25.

If a transmission packet designating the IP address of the relay device 9 and the port number of a web server portion 23 is transmitted from terminals (PCs 10 to 12) connected to a network to be a follower in order to give access to the web server portion 23 (step 36), subsequently, the web server portion 23 transmits the web page to the transmission source terminal of the transmission packet (step 37). The web page describes the effect that the address ranges overlap with each other in first and second networks and a change recommendation address range as shown in FIG. 15. Moreover, a button (a button of "yes" in FIG. 15) which sends a request for changing the address range on the second network (local network) side and a button (a button of "No" in FIG. 15) which does not give the request for changing the address range are displayed. The description is performed in a markup language, for example, HTML in such a manner that a terminal side specifies the buttons by clicking a mouse to transmit the information to the web server portion 23.

When the button of "yes" is specified on the terminal side, the specified information is transmitted from the terminal to the web server portion 23 (step 38). Upon receipt of the specified information from the terminal, the web server portion 23 changes the address range of the DHCP assignment address range storing means 25a in order to prevent the address ranges from overlapping with each other by the address overlap detecting means 26a (step 40). For example, in the case in which the IP address range of the network on the first network I/F portion side is "192. 168. 0. 0/24" and a range of "192. 168. 0192/26" is set to the DHCP assignment address range storing means 25a, the range of the DHCP assignment address range storing means 25a is changed to a range of "192. 168. 1. 192/24", and furthermore, the IP address of DHCP assignment table storing means 25b is changed. In addition, the IP address stored in self device address storing means 25e is changed to have the range of "192. 168. 1. 192/24" (for example, "192. 168. 1. 193").

While the description has been given on the assumption that the button of "yes" on the web page is specified at the terminal side to operate the address range setting means 26b, it is also possible to operate the address range setting means 26b by pressing down the switch portion 27. Moreover, it is a matter of course that the structure can properly be combined with the structure of the relay device according to the second embodiment.

As described above, according to the relay device in accordance with the third embodiment, in the case in which an address to be assigned to a terminal to be a follower overlaps with the address range of the first network, a notice of the information can be sent. Therefore, a manager for the second network can easily grasp the overlap. By a request sent from the terminal to be the follower, moreover, it is possible to avoid an overlap with the address range of the first network.

Fourth Embodiment

Figure 16:
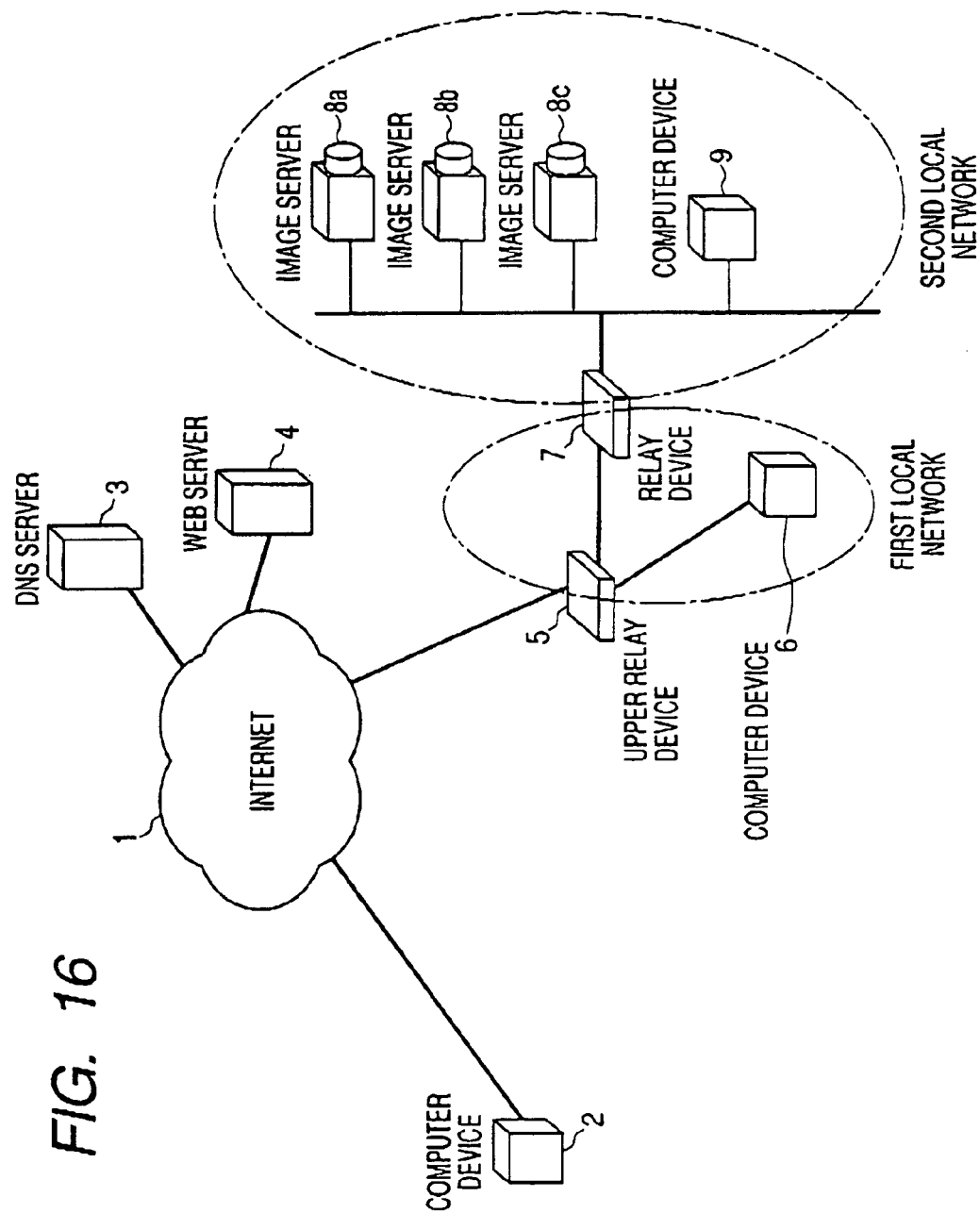
FIG. 16 is a view showing the structure of a network system including a relay device according to a fourth embodiment of the invention.

FIG. 16 is a view showing the structure of a network system including a relay device according to a fourth embodiment of the invention.

In FIG. 16, a reference numeral 1 denotes a wide area network such as an internet, a reference numeral 2 denotes a computer device (hereinafter referred to as a PC 2) connected to the wide area network 1. The PC 2 has general purpose browser means and can give access to a web server 4 which will be described below, thereby displaying a web page.

A reference numeral 3 denotes a DNS (Domain Name System) server which relates an IP address assigned to an apparatus connected to the wide area network 1 and a host name corresponding thereto and stores them, and retrieves the stored information when receiving a request for the IP address of an apparatus having a certain host name through the wide area network 1 from a client terminal such as the PC 2, and transmits the IP address for the requested host name to the client terminal.

A reference numeral 4 denotes a web server which provides a web page to access given from the computer device 2. The web page is described in a mark-up language such as HTML and includes a program such as Java (registered trademark) in some cases.

A reference numeral 5 denotes an upper relay device connected to the wide area network 1 (which will be hereinafter referred to as the upper relay device because a distinction from a relay device 7 to be described below is caused to be clear) which constitutes a first local network to be a follower. A reference numeral 6 denotes a computer device (hereinafter referred to as a PC 6) connected to the first local network. It is possible to perform a communication between the PC 6 connected to the first local network and the PC 2 connected to the wide area network 1 through the upper relay device 5.

A reference numeral 7 denotes a relay device (a server and a relay device according to the invention), reference numerals 8a to 8c denote image servers, and a reference numeral 9 denotes a computer device (hereinafter referred to as a PC 9) which constitutes a second local network by setting the image servers 8a to 8c and the PC 9 to be followers. The relay device 7 has a function of relaying the communication packet of the first local network and the second local network, and furthermore, a function of a web server.

Figure 17:
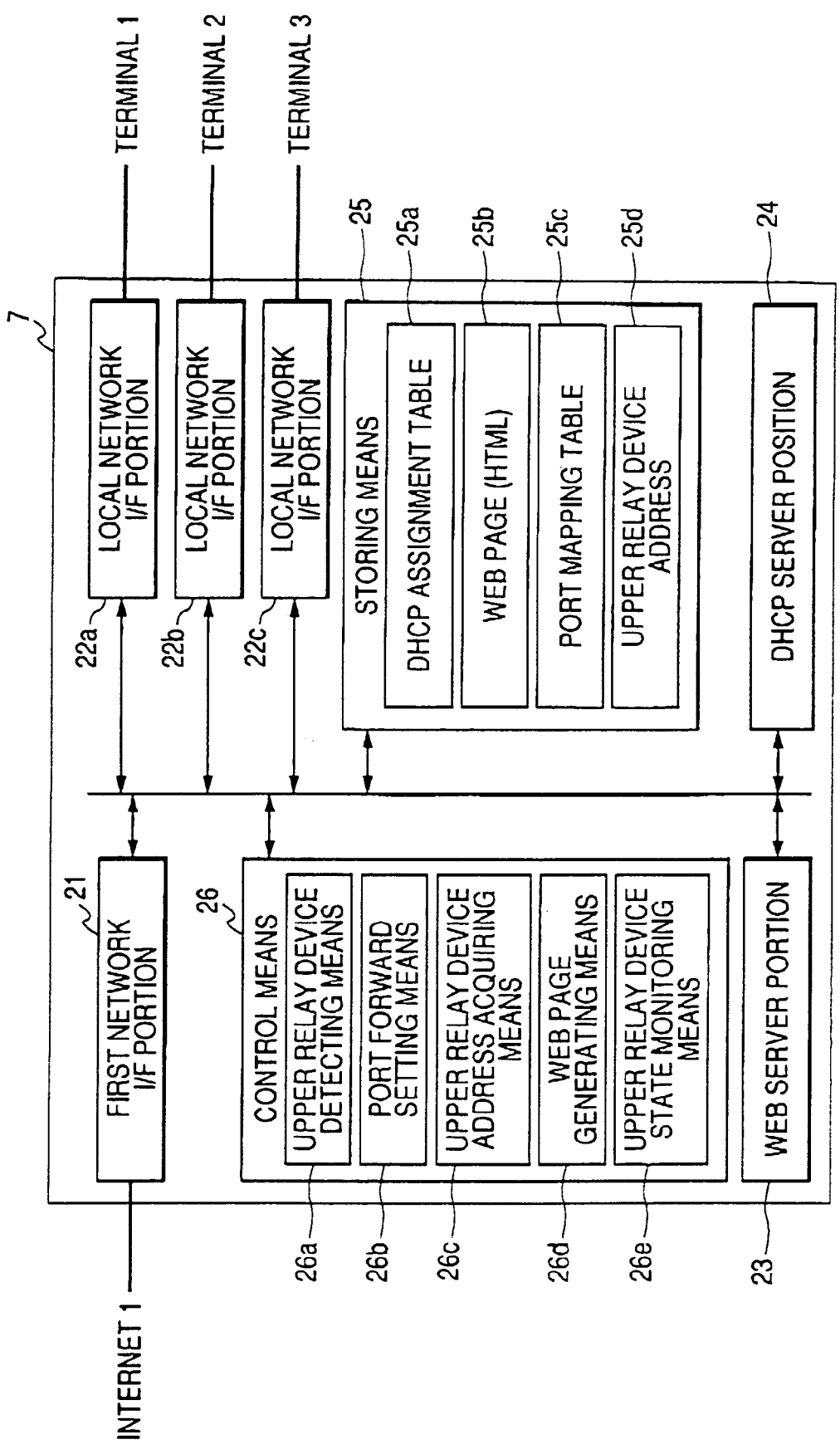
FIG. 17 is a diagram showing the internal structure of the relay device according to the fourth embodiment of the invention.

Next, the internal structure of the relay device 7 according to the fourth embodiment of the invention will be described with reference to FIG. 17. FIG. 17 is a diagram showing the internal structure of the relay device according to the fourth embodiment of the invention. In FIG. 17, 21 denotes a first network I/F portion to be connected to the first network, which can be connected to the first local network to be the follower of the wide area network 1 and the upper relay device 5 based on a protocol such as TCP/IP.

Reference numerals 22a to 22c denote local network I/F portions which can connect the PC 9 to the image servers 8a to 8c and constitute the second local network together with apparatuses connected to the local network I/F portions 22a to 22c including the relay device 7 (including the case in which the connection is performed through a hub) as shown in FIG. 16.

A reference numeral 23 denotes a web server portion which is constituted to be accessible through the first network I/F portion 21 and the local network I/F portions 22a to 22c.

For example, when the local IP address of the first network I/F portion 21 is assigned to "192. 168. 1. 1" and a packet designating "Http://192.168.1.1.80" is transmitted from the PC 6, the transmission packet is routed to the relay device 7 through the upper relay device 5. Since the transmission packet is accessed with a port number of 80, it is received by the web server portion 23 (the port number of 80). When access is given from the PC 9, the web server portion 23 gives control means 26 which will be described below a request of an operation for transmitting a predetermined web page or changing the set contents of the relay device 7 in accordance with the contents of the access.

A reference numeral 24 denotes a DHCP server portion which registers one of local IP addresses which are not set to a DHCP assignment table 25b which will be described below upon receipt of an IP address assignment request from the apparatus connected to the second network, and returns a response of local IP address assignment OK to the same apparatus.

A reference numeral 25 denotes storing means which stores programs and various set information. The storing means includes each storing means which will be described below.

A reference numeral 25a denotes DHCP assignment table storing means which serves to store an IP address assigned to a terminal to be a follower by the DHCP server portion 24 together with the MAC address of the terminal. The DHCP assignment table storing means 25a is constituted as shown in FIG. 18, for example. FIG. 18 shows that an IP address "192. 168. 0. 2" is assigned to the relay device 7 and IP addresses "192. 168. 0. 3" to "192. 168. 0. 5" are assigned to the image servers 8a to 8c, respectively.

A reference numeral 25b denotes web page storing means which serves to store a preset web page and a web page generated by web page generating means 26d which will be described below. The web page is screen display information created in a markup language such as HTML or by a program such as Java (registered trademark) and is used to be displayed by the display means of the computer device.

A reference numeral 25c denotes port mapping table storing means which stores the port mapping table of the self device 7 (which will be hereinafter referred to as a "self device port mapping table") and the port mapping information of the upper relay device 5 (which will be hereinafter referred to as "upper relay device port mapping information").

The self device port mapping table is set in relation to a port number on the first network I/F portion 21 side (which will be hereinafter referred to as a "self device external port number") based on a port forward request (transfer set request) sent from an apparatus connected to the second local network, and is constituted as shown in FIG. 19, for example. FIG. 19 shows that port forward setting (transfer setting) for the image servers 8a to 8c and the PC 9 is performed. For example, in the case in which a packet is transmitted from the first network side to the IP address on the first network side of the relay device 7, a destination IP address is changed to "192. 168. 0. 2" and a destination port number is changed to "800" in accordance with the self device port mapping table in FIG. 19 and the packet is then transferred from the local network I/F portion 22 if the destination port number of the packet is "8001".

Moreover, the upper relay device port mapping information is obtained by relating the self device external port number to an external port number on the wide area network side of the upper relay device 5 (which will be hereinafter referred to as an "upper relay device external port number"). The information is obtained by relating and storing the self device external port numbers set to the image servers 8a to 8c in the self device external port numbers set to the self device port mapping table and the upper relay device external port number requested to be set by port forward setting means 26b which will be described below with respect to the self device external port number, and is constituted as shown in FIG. 20, for example. FIG. 20 shows that upper relay device external port numbers of "80", "8000", "8003" and "8004" to self device external port numbers of "80", "8001", "8002" and "8003".

A reference numeral 25d denotes upper relay device address storing means for storing an IP address on the wide area network side of the upper relay device 5 (which will be hereinafter referred to as an "upper device external address").

A reference numeral 26 denotes control means for controlling the whole relay device 9 which has various control means such as upper relay device detecting means 26a, port forward setting means 26b, upper relay device address acquiring means 26c, web page generating means 26d, and upper relay device state monitoring means 26e.

The upper relay device detecting means 26a multicasts or broadcasts a router discovery packet from the first network I/F portion 21 if the IP address of the self device 7 is a local IP address, and decides that the upper relay device 5 is present when a response is obtained. The upper relay device detecting means 26a may unicast the router discovery packet into a default gateway and may decide from an IP address included in a response packet that the relay device 5 is present if a response is obtained. Moreover, it is also possible to simply make a decision depending on whether the IP address of the self device 7 is identical to the local IP address.

The port forward setting means 26b serves to perform port forward setting for the upper relay device 5. More specifically, the port forward setting means 26b transmits, to the upper relay device 5, a port forward setting request including the self device external port numbers set to the image servers 8a to 8c in the self device external port numbers set to the self device port mapping table, the IP address on the first network I/F portion side of the self device 7 and the upper relay device external port number to be set for a transfer, thereby performing the port forward setting for the upper relay device 5. For the port forward setting request, the upper relay device external port number and the self device external port number which are subjected to the port forward setting are related to each other and are thus stored as the upper relay device port mapping information of the port mapping table storing means 25c upon receipt of a response of setting OK from the upper relay device 5.

The upper relay device address acquiring means 26c gives the upper relay device 5 a request for transmitting address information (an upper device external address) on the wide area network 1 side (the external network side) of the upper relay device 5, acquires upper relay device external address information included in a response to the request and stores the same information in the upper relay device address storing means 25d.

The web page generating means 26d generates a web page including link information to the image servers 8a to 8c based on the information of the port mapping table storing means 25c. The web pages thus generated are executed based on both the self device port mapping table and the upper relay device port mapping information.

If it is decided that the upper relay device 5 is present by the upper relay device detecting means 26a, link information is generated from the upper relay device external port number of the upper relay device port mapping information and the upper device external address stored in the upper relay device address storing means 25*d*.

If it is decided that the upper relay device 5 is not present by the upper relay device detecting means 26*a*, moreover, link information is generated from the self device external port number of the self device port mapping table and an address on the first network side of the self device 7.

The upper relay device state monitoring means 26*e* monitors whether or not the external IP address of the upper relay device 5 is changed and whether or not the port forward setting contents of the upper relay device 5 are changed.

Figure 22:
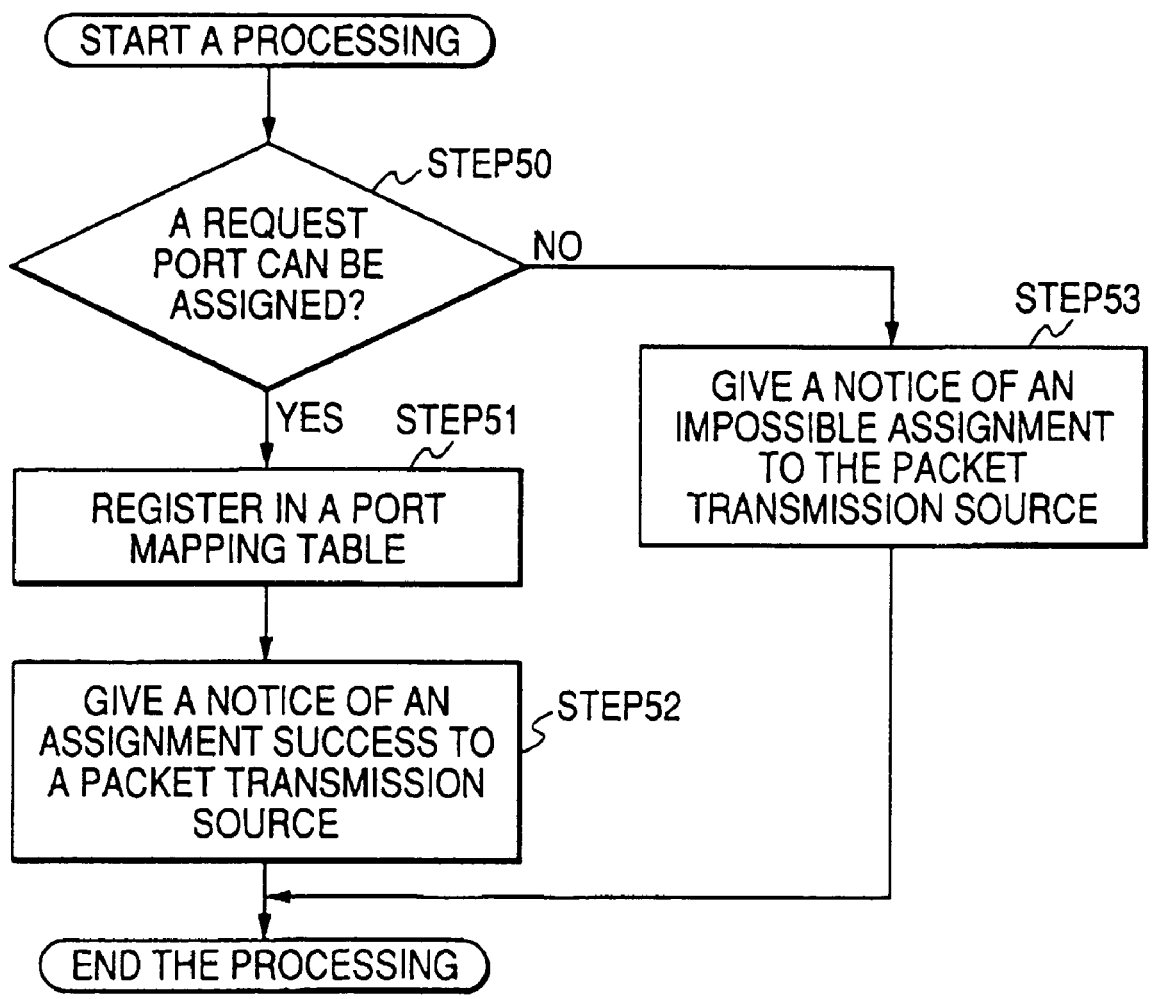
FIG. 22 is a flow chart showing the operation of a port forward set processing in the relay device according to the fourth embodiment of the invention.
Figure 23:
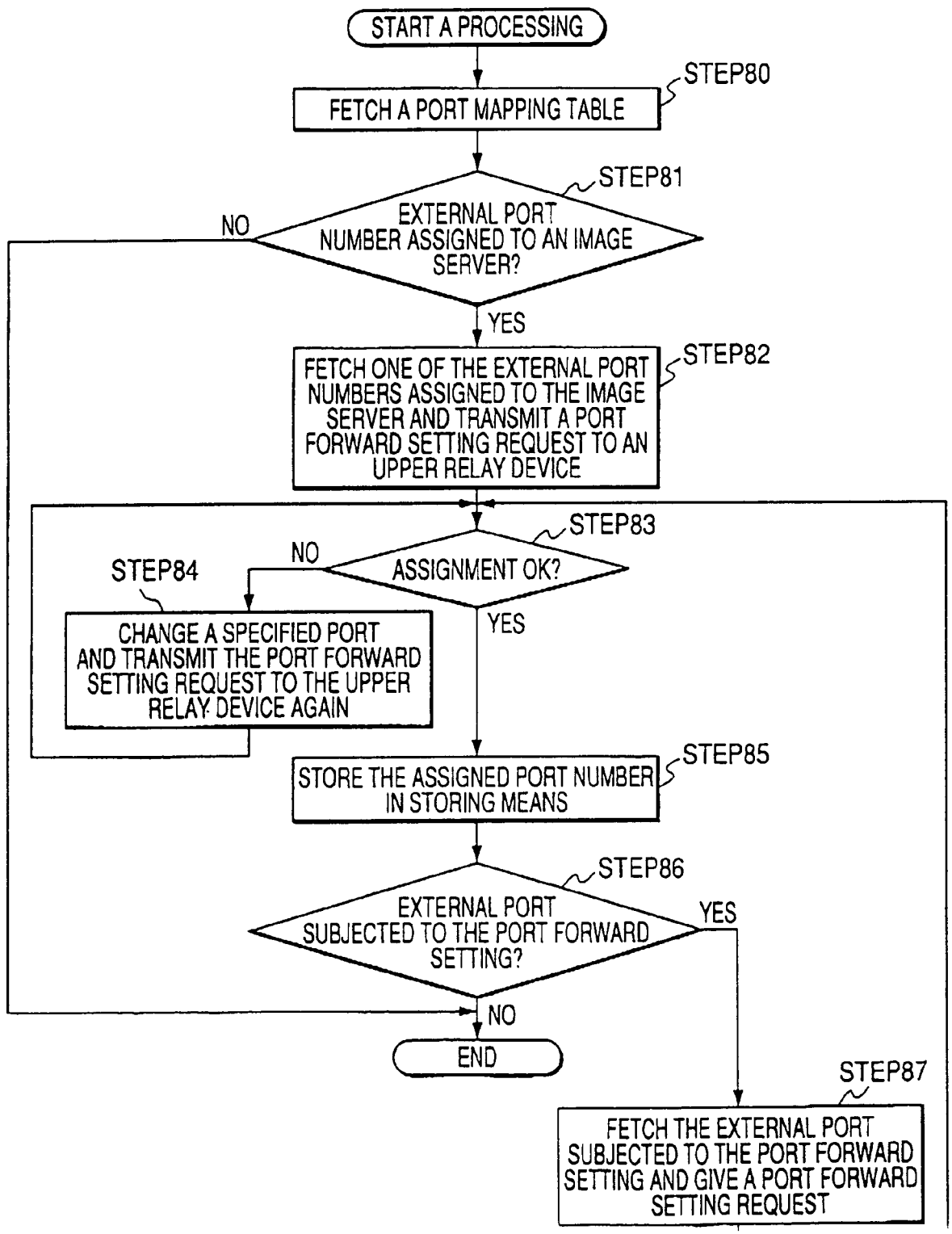
FIG. 23 is a flow chart showing a port forward set processing operation to an upper relay device in the relay device according to the fourth embodiment of the invention.

By using flow charts of FIGS. 21 to 23, specific description will be given to the operation of the relay device 5 according to the fourth embodiment of the invention which has the above structure.

Figure 21:
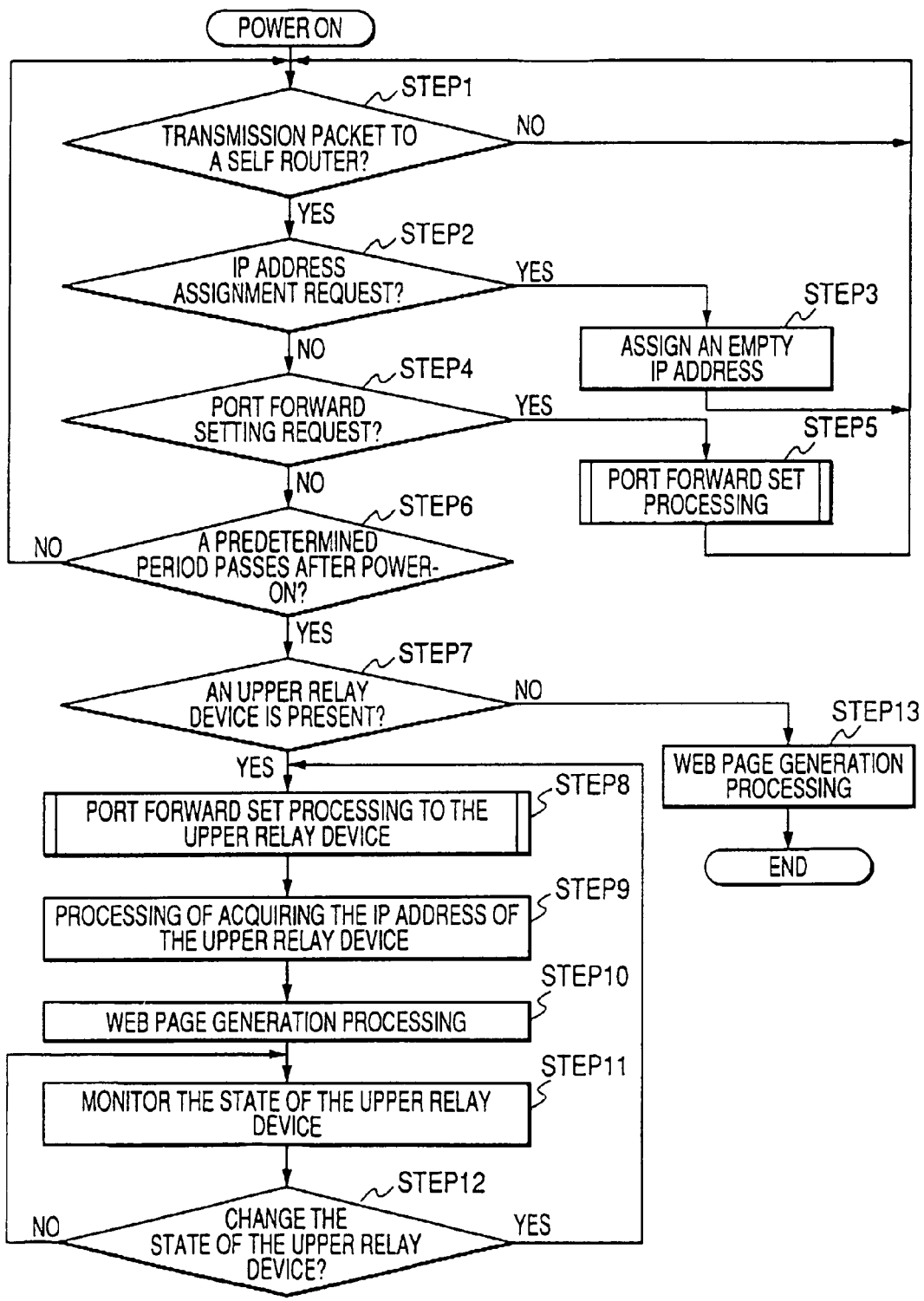
FIG. 21 is a flow chart showing the operation of the relay device according to the fourth embodiment of the invention.

In FIG. 21, first of all, when the power supply of the relay device 7 is turned ON, a transmission packet is waited to be received from the second network side to the self device 7 for a predetermined period (step 1), and it is decided whether or not the transmission packet is an IP address assignment request upon receipt of the transmission packet (step 2). If the transmission packet is the IP address assignment request, any of the IP addresses which can be assigned by the self device 7 and is not used is assigned to the transmission source apparatus of the transmission packet (step 3). On the other hand, if the transmission packet is a port forward setting request (a transfer request) (step 4), a port forward set processing is performed (step 5). The details of the port forward set processing will be described below.

If it is decided that the predetermined period has passed after the ON operation of the power supply (step 6), the upper relay device detecting means 26*a* decides whether or not the upper relay device 5 is present (step 7). By the decision, a router discovery packet is multicast or broadcast from the first network I/F portion 21 if the IP address of the self device 7 is identical to the local IP address, it is judged that the upper relay device 5 is present when a response is obtained, and it is judged that the upper relay device 5 is not present when the response is not sent to the router discovery packet. The IP address of the self device 7 is stored in the storing means 25, and is dynamically assigned from a DHCP server (not shown) connected to the first network in some cases and is input and set by input means such as the PC 9 connected to the second network side by giving access from the PC 9 to the web server portion 23 in other cases.

If it is decided that the upper relay device 5 is present, the port forward set processing of the upper relay device 5 is performed by the port forward setting means 26*b* (step 8). The port forward set processing will be described below.

When the port forward set processing for the upper relay device 5 is ended, an address notice request is then sent to the upper relay device 5 in order to give a notice of an IP address on the wide area network 1 side of the upper relay device 5 by the upper relay device address acquiring means 26*c*. Thereafter, upper relay device external address information included in the response of the upper relay device 5 is acquired and is stored in the upper relay device address storing means 25*d* (step 9).

When the external address information of the upper relay device 5 is acquired, the web page generating means 26*d* generates link information from the upper relay device external port number of the upper relay device port mapping information stored in the port mapping table storing means 25*c* and the upper relay device external address stored in the upper relay device address storing means 25*d*, thereby generating a web page including the link information (step 10). For example, in the case in which the external address of the upper relay device 5 is "60. 5. 4. 3" and the link information is described in HTML, link information to the image server 8*a* is generated as <href="60.5.4.3:8000/image.jpeg"> and link information to the image server 8*c* is generated as <href="60.5.4.3:8004/image.jpeg">.

When the web page generation processing is ended, the setting state of the upper relay device 5 is subsequently monitored. If a change is made, a processing corresponding to the change is performed (steps 11 and 12). More specifically, the upper relay device state monitoring means 26*e* periodically monitors whether or not the external IP address of the upper relay device 5 is changed and whether or not the port forward set contents of the upper relay device 5 are changed. The upper relay device state monitoring means 26*e* gives an upper relay device external address acquirement request or a port forward set situation notice request from the first network I/F portion 21 side to the upper relay device 5 and the monitoring operation is performed based on a response thereof. If it is decided that the upper relay device external address is changed, the upper relay device state monitoring means 26*e* gives a notice of the upper relay device address thus changed to the control means 26, and the control means 26 replaces the upper relay device address stored in the upper relay device address storing means 25*d* with an upper relay device address obtained after the change, and furthermore, generates a web page by using an upper relay device external address stored newly in the upper relay device address storing means 25*d* for the web page generating means 26*d*, thereby updating the contents of the web page storing means 25*b*. For example, the upper relay device state monitoring means 26*e* decides whether or not the upper relay device address is identical to an upper relay device external address "60. 5. 4. 0" stored in the relay device address storing means 25*d*. If the upper relay device address is changed to "60. 5. 4. 3", the change is detected and a notice is sent to the control means 26. The control means 26 replaces the upper relay device external address "60. 5. 4. 0" stored in the upper relay device address storing means 25*d* with "60. 5. 4. 3". Furthermore, the control means 26 gives the web page generating means 26*d* a request for generating a web page by using the address obtained after the change. The web page generating means 26*d* generates link information based on the upper relay device external address "60. 5. 4. 3" obtained by the change and the upper relay device external port number of the upper relay device port mapping information stored in the port mapping table storing means 25*c*, and generates a web page including the link information. The upper relay device port mapping table is set as shown in FIGS. 5A and 5B. In the case in which the link information is described in the HTML, the link information to the image server 8*a* is generated as <href="60.5.4.3:8000/image.jpeg"> and the link information to the image server 8*c* is generated as <href="60.5.4.3:8004/image.jpeg">, thereby generating a web page. Then, the web page thus generated is overwritten to the web page storing means 25*b*.

If it is decided that the port forward set contents of the upper relay device 5 are changed, moreover, the upper relay device state monitoring means 26*e* gives a notice of the changed address to the control means 26 and the control means 26 operates the port forward setting means 26*b*, thereby performing the port forward setting over the upper relay device 5 again. For example, if it is decided by the upper relay device state monitoring means 26*e* that the port forward set contents of the upper relay device 5 are not present at all, the port forward set processing over the upper relay device 5 at the step 8 is performed and the web page generation processing at the step 10 is then performed. In the case in which the power supply of the upper relay device 5 is turned OFF in the middle of the processing so that the port mapping table of the upper relay device 5 is initialized, the port forward set contents of the upper relay device 5 are eliminated. In the case in which only a part of the port forward setting is changed or eliminated, the port forward set processing over the upper relay device 5 is performed in relation to an upper relay device external port number corresponding to the port forward setting which is changed or eliminated.

If it is decided that the upper relay device 5 is not present at the step 7, link information based on the self device port mapping table stored in the port mapping table storing means 25c is generated by the web page generating means 26d and a web page including the same link information is generated. An IP address on the first network I/F portion 21 side of the relay device 7 is set to be "60. 5. 4. 5" and the self device port mapping table is set as shown in FIG. 4. In the case in which the link information is described in the HTML, the link information to the image server 8a is generated as <href="60.5.4.5:8000/image.jpeg"> and the link information to the image server 8c is generated as <href="60.5.4.5:8001/image.jpeg">.

As described above, it is possible to change the link information of the generated web page depending on whether or not the upper relay device 5 is present. In the case in which the upper relay device 5 is not present, a global IP address is often assigned as an IP address on the first network I/F portion 21 side of the relay device 5. Although the description has been given on the assumption that the IP address on the first network I/F portion 21 side of the relay device 7 is assigned to "60. 5. 4. 5", therefore, a local IP address is assigned in some cases in which the upper relay device 5 is not present.

While the description has been given on the assumption that the IP address and port forward setting is performed upon receipt of the request sent from the apparatus connected to the second network in the processings of the steps 1 to 5, it is also possible to detect the apparatus connected to the second network to which the relay device 7 is connected, thereby setting the IP address and port forward. For example, when the image server 8 is connected to the second network, the MAC address of the image server is broadcast at a predetermined interval for a predetermined period and the relay device 7 performs automatic setting (the assignment of the IP address and the port forward setting) to the image server upon receipt of the request.

Next, the port forward set processing of the self device 7 at the step 5 will be described with reference to FIG. 22.

Upon receipt of a port forward setting request from the apparatus connected to the second network, the control means 26 decides whether or not an external port number specified by the request is an unassigned number (step 50). If the specified external port number is unassigned and can be assigned, the IP address, the MAC address and the port number of the apparatus included in the port forward setting request are related to the self device external port number of the relay device 7 and are stored in the self device port mapping table of the port mapping table storing means 25c (step 51). Then, a response of assignment OK is transmitted to the apparatus giving the port forward setting request (step 52). On the other hand, if the self device external port number which is specified has already been assigned and the port forward setting cannot be performed at the specified self device external port number, a response of assignment NO is transmitted to the apparatus giving the port forward setting request (step 53).

The port forward set processing of the relay device 7 is performed as described above.

Next, the port forward set processing to be performed over the upper relay device 5 at the step 8 will be specifically described with reference to FIG. 23.

First of all, a self device port mapping table is fetched from the port mapping table storing means 25c (step 80). Then, it is decided whether or not the port forward setting is performed over the image server 8 in the self device port mapping table thus fetched (step 81). If it is decided that the port forward setting is performed over the image server 8, one of the self device external port numbers subjected to the port forward setting is fetched and a port forward setting request is transmitted to the upper relay device 5 (step 82). The port forward setting request includes an upper relay device external port number to be specified in addition to the external IP address of the self device 7 and the fetched self device external port number. If it is decided that a response of port forward setting OK is transmitted from the upper relay device 5 (step 83), thereafter, the self device external port number subjected to the port forward setting by the upper relay device 5 is related to the upper relay device external port number and they are stored as upper device port mapping information in the port mapping table storing means 25c (step 85). On the other hand, if a response of assignment NO is transmitted from the upper relay device 5 at the step 83, the upper relay device external port number to be specified is changed and the transmission of the port forward setting request is repeated for the upper relay device 5 until the response of assignment OK is obtained (step 84).

Subsequently, the processing is repeated for all of the self device external port numbers subjected to the port forward setting to the image server 8 until the port forward setting to the upper relay device 5 is completed, and the port forward setting to the upper relay device 5 is thus performed (steps 86 and 87).

While the port forward setting is performed for only the image server in the self device port mapping table, other kinds of servers may be subjected to the port forward setting.

At the self device external port number (for example, "80") assigned to the web server portion 23, moreover, the port forward setting request is sent to the upper relay device 5 through the port forward setting means 26b.

Figure 24:
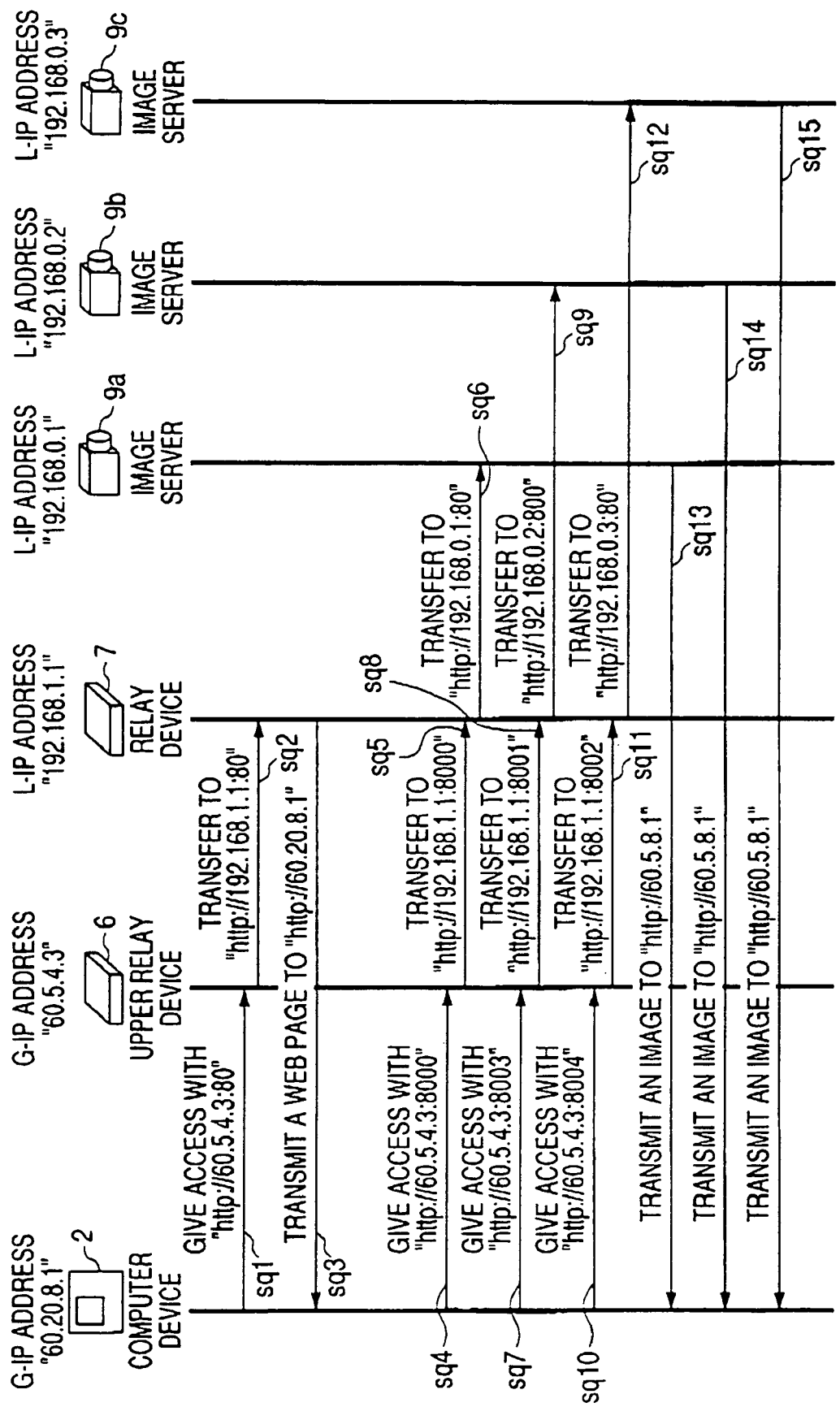
FIG. 24 is a diagram showing the operation sequence of a network system including the relay device according to the fourth embodiment of the invention.
Figure 25:
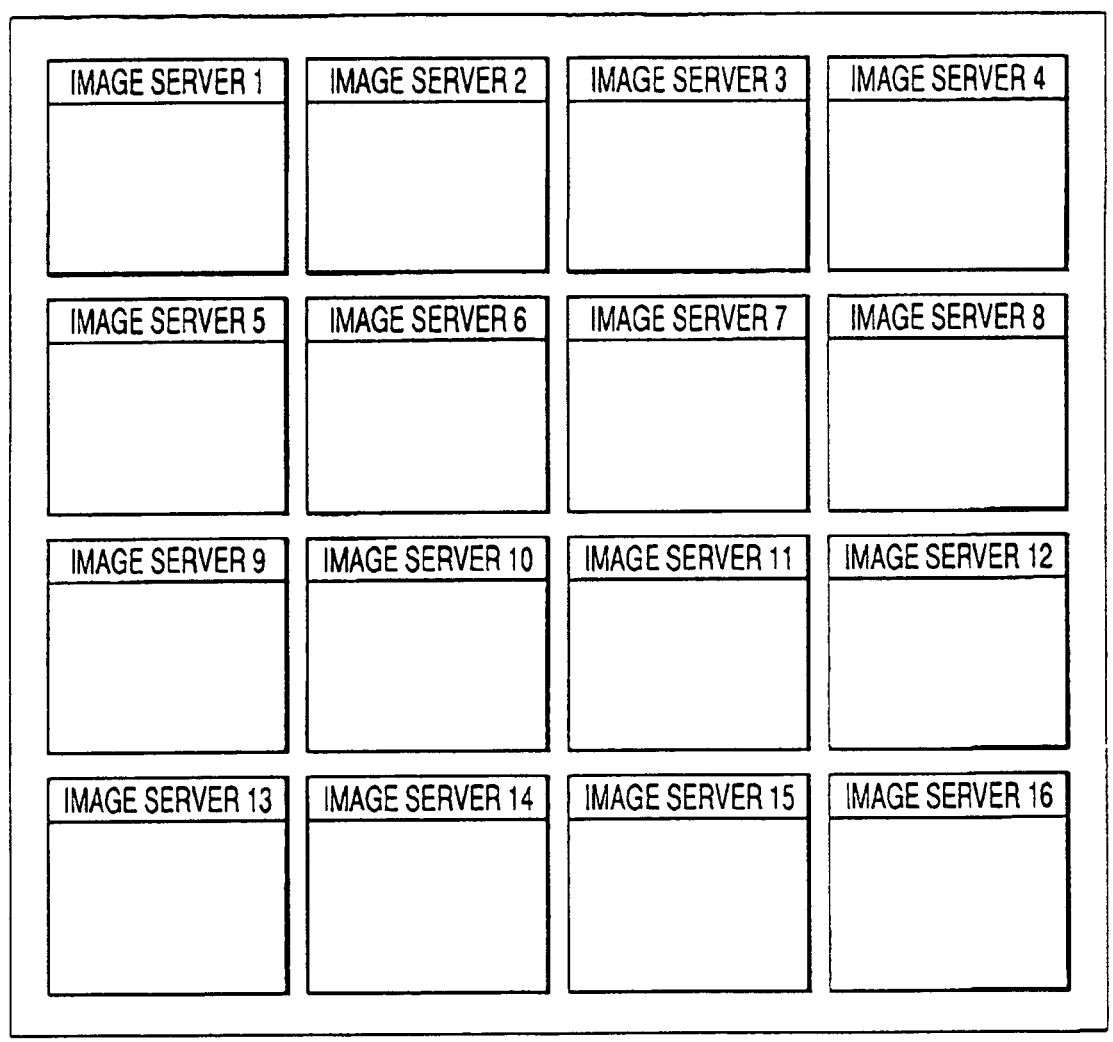
FIG. 25 is a diagram showing the display contents of a web page in the relay device according to the fourth embodiment of the invention.
Figure 26:
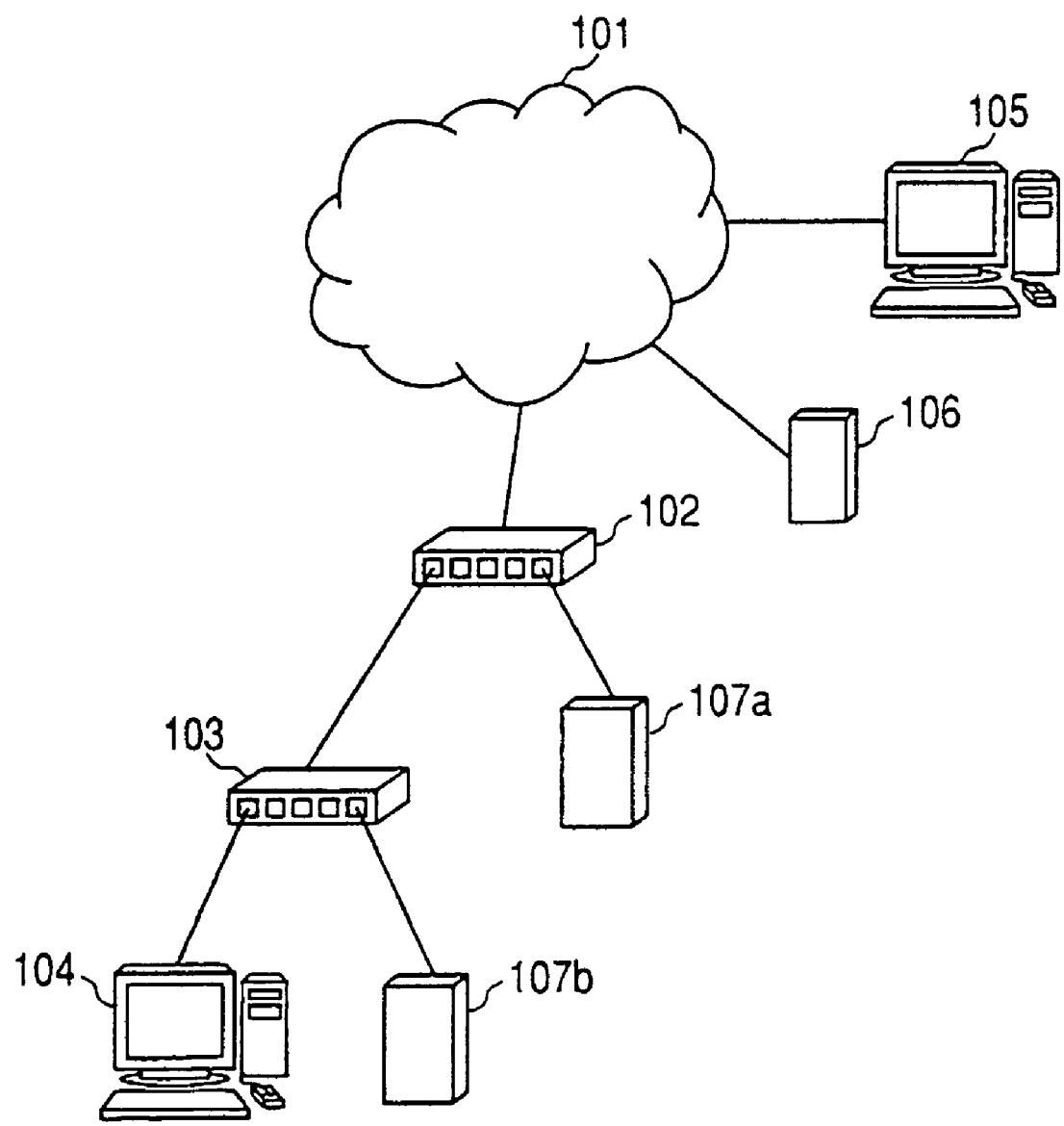
FIG. 26 is an explanatory view showing a conventional router having a UPnP standard which is provided in two stages between an internet and a CP.

Referring to FIGS. 24 and 25, next, description will be given to an operation for giving access to the relay device 7 through the upper relay device 5 from the PC 2 connected to the wide area network 1 and acquiring, from the relay device 7, the web page generated as described above.

It is assumed that the self device port mapping table and the upper relay device port mapping information are set as shown in FIGS. 19 and 20, respectively. Moreover, it is assumed that the upper relay device port mapping is also set in such a form as to correspond to the upper relay device port mapping information (the upper relay device external port number of "80" is subjected to the port forward setting to the port No. 80 of the relay device 7).

First of all, a packet is transmitted in an Http protocol with a destination of "60. 5. 4. 3 : 80" (a destination IP address of "60. 5. 4. 3" and a destination port number of "80". Explanation will be given in the same describing method) from the PC2 of an IP address "60. 5. 4. 3" to be a client terminal (sq1). The packet is received by the upper relay device 5 having the IP address of "60. 5. 4. 3". The upper relay device 5 fetches a destination port number from the received packet and decides the transmission destination of the received packet. The port number of "80" is set to be transferred to the port "80" of the relay device 7 "192. 168. 1. 1". Therefore, the upper relay device 5 transfers the packet received from the computer device 2 by setting the IP address "192. 168. 1. 1" and the port number "80" of the relay device 7 to be destinations (sq2). Upon receipt of the transferred packet, the relay device 7 gives a notice of the data contents of the packet to the web server portion 23 assigned to the port number of "80". The web server portion 23 fetches a web page generated by the web page generating means 26d from the web page storing means 25b and returns the web page to the PC 2 to be the transmission source of the packet (sq3). When the web page is received by the PC 2, the contents are executed. The web page is described or programmed in order to display, on each frame, image data from the image servers 8a to 8p (8d to 8p are not shown) as shown in FIG. 25, and the PC 2 sends a request for transmitting, to each image server 8, the image data in each frame to be displayed by display means based on the information of the web page transmitted from the relay device 7 (sqs 4 to 12) and each server 8 transmits the image data in accordance with the request of the PC 2 (13 to 15). For example, <href="6.5.4.0:8000/image.jpeg"> is described in HTML in such a manner that "image.jpeg" of a device having an IP address of "6. 5. 4. 0" and a port number of "8000" can be displayed in the frame of "image server 1", and the PC 2 transmits, to the wide area network 1, a packet sending a request for "image.jpeg" to "60. 5. 4. 3 : 8000" in an Http protocol (sq4). The request packet is received by the upper relay device 5 and a destination port number is analyzed, and the request packet is transferred to a destination IP address of "192. 168. 1. 1" and a destination port number of "8000" based on the port mapping table of the upper relay device 5 (sq5). The same packet is received by the relay device 7 and a destination port number is analyzed, and the packet is transferred to a destination IP address of "192. 168. 0. 1" and a destination port number of "80" based on the self device port mapping table stored in the port mapping table storing means 25c (sq6).

The four embodiments described above can be properly utilized in combination of respective manners.

The present invention is based on Japanese Patent Applications No. 2003-192671, No. 2003-192672, and No. 2003-192673, which are incorporated herein by references. While only certain embodiments of the invention have been specifically described herein, it will be apparent that numerous modifications may be made thereto without departing from the spirit and scope of the invention.

ADVANTAGE OF THE INVENTION

As described above embodiments, it is possible to provide a relay device capable of detecting a connection state in two stages and performing a proper control corresponding to a state.

According to the relay device of the present invention, a connection state in two stages can be detected. Corresponding to the detection of the state, dynamic forward setting is performed to open a port and the port can be connected to a network.

Alternatively, the assignment of the address of a DHCP can be properly performed. Also in the case in which a relay device for rewriting an IP address or a port number to transfer a packet is present between a client and a server, it is possible to dynamically generate a web page linked to the server such as a camera server and to give access from a client terminal to a router, thereby acquiring information from the server.

What is claimed is:

1. A relay device for relaying a data packet between a first network and a second network each being part of a same local area network (LAN), said relay device comprising:
a first interface;
a second interface; and
a control portion capable of performing port forward setting,
wherein, when the first interface is connected to a third network through a relay of the first network and the second interface is connected to a terminal device of the second network, and when the relay device receives a port forward request from the terminal device, the control portion sends a port forward setting request to the relay to request the relay to create a port number relation between a port number of the relay and a port number of said relay device, and the control portion creates a port number relation between the port number of said relay device and a port number of the terminal device,
wherein the control portion receives the data packet transferred by the relay to said relay device using the relation between the port number of the relay and the port number of said relay device, and transfers the received data packet using the relation between the port number of said relay device and the port number of the terminal device.

2. The relay device according to claim 1,
wherein the control portion detects a port number on the first interface side specified by the port forward setting request upon receipt of the request from the terminal device and transmits, to the relay, a port forward setting request specifying the same port number as the port number thus detected.

3. The relay device according to claim 2,
wherein, when the port forward setting for the relay is rejected, the control portion rejects the port forward setting from the terminal device.

4. The relay device according to claim 2,
wherein, when a port number on the first interface side specified by the port forward setting request sent from the terminal device is unusable, the control portion rejects the port forward setting request.

5. The relay device according to claim 2,
wherein, even if the port number on the first interface side specified by the port forward setting request sent from the terminal device is unusable, the control portion sets, to the relay, the same port number as the port number to be a port number on the third network side, and
if the port forward setting performed by setting a forward destination port number to be a port number which can be utilized by a self machine is accepted, the control portion sends a response of successful setting to the port forward setting request send from the terminal device.

6. The relay device according to claim 1, further comprising:
an upper relay device presence confirming portion for checking whether a response is sent from the relay and for deciding, according to the response, whether the first interface is connected to the relay or is directly connected to the third network.

7. The relay device according to claim 6,
wherein, only when deciding that the first interface is connected to the relay, the upper relay device presence confirming portion performs the port forward setting for the relay by the control portion.

8. The relay device according to claim 6,
wherein, when the upper relay device presence confirming portion multicasts or broadcasts a router discovery packet from the first interface and receives a response, said upper relay device presence confirming portion decides that the relay is present.

9. The relay device according to claim 8,
wherein, in a case that a private address is assigned to the first interface, when the upper relay device presence confirming portion multicasts or broadcasts a router discovery packet from the first interface and receives a response, the upper relay device presence confirming portion decides that the relay is present.

10. The relay device according to claim 6,
wherein, when the upper relay device presence confirming portion unicasts a router discovery packet into a default gateway and receives a response, the upper relay device presence confirming portion decides that the relay is present from an IP address included in a response packet.

11. The relay device according to claim 6,
wherein the control portion performs the port forward setting for the self machine and the relay with an external port number specified by the port forward setting request sent from the terminal device.

12. A port forward setting method of a relay device for relaying a data packet between a first network and a second network each being part of a same local area network (LAN), said method comprising the steps of, when a first interface is connected to a third network through a relay and a second interface is connected to a terminal device, and when the relay device receives a port forward setting request from the terminal device:
    sending a port forward setting request to the relay to request the relay to create a port number relation between a port number of the relay and a port number of the relay device;
    creating a port number relation between a port number of the relay and a port number of the relay device;
    receiving the data packet, which the second relay transfers to the relay device using the relation between the port number of the second relay and the port number of the relay device; and
    transferring the received data packet using the relation between the port number of the relay device and the port number of the terminal device.

13. The port forward setting method of a relay device according to claim 12, further comprising the step of:
    when the first interface is not connected to the relay, and when the relay device receives a port forward setting request from the terminal device,
    canceling a transmission of a port forward setting request from the first interface.

14. A relay device for relaying a data packet between a first network and a second network, comprising:
    a storing section for storing a range of an address to be dynamically assigned to an apparatus connected to the second network;
    a detector for detecting an address range of the first network;
    an address overlap deciding section for deciding whether or not the address range detected by the detector and the address range stored in the storing section overlap with each other; and
    an address changing section for changing the address range stored in the storing section so as not to overlap with the address range detected by the detector when deciding that the address ranges overlap with each other by the address overlap deciding section.

15. The relay device according to claim 14,
wherein the detector detects the address range of the first network based on an address of a self device assigned from an address assigning device of the first network.

16. The relay device according to claim 14, further comprising:
    a setting section for setting an address of a self device based on an input from input section,
    wherein the detector detects the address range of the first network based on an address of the first network which is set by the setting section.

17. The relay device according to claim 15,
wherein the detector detects the address range of the first network from a subnet mask or a CIDR.

18. The relay device according to claim 14, further comprising:
    a second storing section for fixedly storing an address to which access can be given to a self device also when an address of the self device is changed by the address changing section; and
    a self device responding section for returning a predetermined response when access is given from the second network to an address stored in the second storing section,
    wherein, when a transmission packet is sent from the second network side to the address stored in the second storing section after the address range stored in the storing section is changed by the address changing section, the self device responding section is operated without transferring the transmission packet to the first network side.

19. The relay device according to claim 18,
wherein, after the address range stored in the storing section is changed by the address changing section, and when the self device responding section is operated without transferring a transmission packet directed to the address stored in the second storing section from the second network side to the network side, a transmission source address of a response packet is transmitted as an address stored in the second storing section.

20. The relay device according to claim 14, further comprising:
    a third storing section for storing a host name for giving access from the second network side to the self device and an address corresponding to the host name;
    a self device responding section for returning a predetermined response when access is given from the second network to an address prestored in the third storing section; and
    a transfer section for transferring an inquiry of an address for the host name to a predetermined device upon receipt of the inquiry from an apparatus connected to the second network,
    wherein, when the relay device receives an inquiry of address corresponding to a host name stored in the third storing section from the apparatus connected to the second network, the relay device returns response data including the address stored in the third storing section, instead of operation of the transfer section.

21. The relay device according to claim 14, further comprising:
    a third storing section for storing a host name and an address for giving access from the second network side to the self device;
    a self device responding section for returning a predetermined response when access is given from the second network to an address stored in the third storing section; and a monitoring section for monitoring an inquiry of an address for a host name which is transmitted from an apparatus connected to the second network to a server device, wherein, when the monitoring section receives an inquiry of address for a host name stored in the third storing section to the server device, the monitoring section returns response data including the address stored in the third storing section, without relaying the inquiry to the server device.

22. The relay device according to claim 18, wherein the inquiry is a DNS query.

23. The relay device according to claim 18, further comprising:

a self device address changing section for changing the address stored in the second storing section to one of the address ranges stored in the storing section when a request is sent from an apparatus connected to the second network after the address range stored in the storing section is changed by the address changing section.

24. The relay device according to claim 23, further comprising:

a physical switch for operating the self device address changing section.

25. The relay device according to claim 14, wherein the address is an IP address.

26. A relay device for relaying a data packet between a first network and a second network, comprising:

a storing section for pre-storing an address range to be dynamically assigned to an apparatus connected to the second network;

a detector for detecting an address range of the first network;

an address overlap deciding section for deciding whether or not the address range detected by the detector and the address range stored in the storing section overlap with each other;

a second storing section for storing an address for giving access to a self device in address ranges of the second network which are prestored in the storing section; and a self device responding section for returning a predetermined response when access is given from the apparatus connected to the second network to the address stored in the second storing section, wherein, if it is decided that the address ranges overlap with each other by the address overlap deciding section, the self device responding section transmits, to the apparatus, a response notifying that the address ranges overlap with each other.

27. The relay device according to claim 26, further comprising:

an address changing section for changing the address range stored in the storing section so as not to overlap with the address range detected by the detector when a request for releasing the overlap of the address ranges is sent from the apparatus.

28. The relay device according to claim 27, further comprising:

a physical switch for operating the self device address changing means.

29. A server capable of transmitting through a first network screen display information with respect to a request sent from a client terminal, the client terminal being capable of displaying the screen display information, said server comprising:

a detector for detecting whether or not the server is connected to the first network through a relay device; and a section for generating link information included in the screen display information based on the detected result, the link information including either an address of the relay device or an address of the server, wherein said detector detects whether or not the server is connected to the first network through the relay device, based on the address of the server assigned from an address assigning device of the first network.

30. The server according to claim 29, further comprising:

a relay section for relaying a communication between a second network and a third network;

wherein the link information indicates link information for linking to a device connected to the third network.

31. The server according to claim 30, further comprising:

a transfer setting section for setting a transfer of a communication packet received from the second network side to an apparatus connected to the third network; and a display information generating section for generating the screen display information including the link information to the device based on information set by the transfer setting section.

32. The server according to claim 31, wherein the transfer setting section performs transfer setting by relating a port number on the second network side to an address and a port number of the apparatus.

33. The server according to claim 30, further comprising:

a second transfer setting section for giving a transfer setting request to the relay device based on contents set by the forward setting section when a connection to the first network through the relay device is performed, wherein the display information generating section generates the screen display information including the link information to the device based on information set by the second transfer setting section when transfer setting of the relay device is performed by the second transfer setting section.

34. The server according to claim 33, wherein the screen display information including the link information to the device is generated based on an address acquired by sending a request for an address on the first network side of the relay device to the relay device.

35. The server according to claim 33, wherein, after the transfer setting of the relay device is performed by the second transfer setting section, transfer set information or address information of the relay device is then acquired periodically from the relay device.

36. The server according to claim 35, wherein, when a change in transfer set information or address information of the relay device is detected by a periodic acquirement of the transfer set information or the address information, link information included in the screen display information is changed.

37. A relay device capable of relaying a communication between a first network and a second network and transmitting screen display information with respect to a request sent from a client terminal, the client terminal being capable of displaying the screen display information, comprising:

a detector for detecting whether or not a connection to a third network through a relay is performed;

a first storing section for storing transfer set information relating a port number on the first network side to an address and a port number in an apparatus connected to the second network;

a second storing section for storing an address of the relay device on the first network side;

a first request section for sending a request for transmitting address information on the third network side of the relay device;

a third storing section for storing address information acquired by the first request section;

a second request section for sending the relay device a request for transfer setting relating a port number stored in the first storing section and an address stored in the second storing section to a port number on the third network side of the relay device when it is detected that the connection to the third network through the relay device is performed by the detector, a first generating section for generating screen display information including link information indicating both the port number on the third network side set to the relay device and the address information stored in the third storing section by the second request section when the transfer setting of the relay device is performed by the transfer setting request section.

38. The relay device according to claim 37, further comprising:

a second generating section for generating screen display information setting, to be link information, the port number on the first network side stored in the first storing section and the address of the relay device when it is decided that the connection to the third network through the relay device is not performed by the detector.

* * * * *